United States Patent [19]

Tominaga et al.

[11] Patent Number: 5,087,408

[45] Date of Patent: Feb. 11, 1992

[54] NUCLEAR POWER FACILITIES

[76] Inventors: Kenji Tominaga, 21, Nagasaki-5-chome, Toshima-ku, Tokyo; Minoru Miki, 12-5, Nishinarusawacho-4-chome, Hitachi-shi; Tooru Takahashi, 3-17, Ayukawacho-4-chome, Hitachi-shi; Tetsuo Horiuchi, 13-12, Wakabacho-1-chome, Hitachi-shi; Hideo Morishima, 20-30, Kujicho-4-chome, Hitachi-shi; Takashi Nakayama, 1-1, Jonancho-4-chome, Hitachi-shi; Kumiaki Moriya, 2-1, Jonancho-3-chome, Hitachi-shi; Masaki Matsumoto, 1906-6, Takaba, Katsuta-shi; Minoru Akita, 4-27, Osecho-4-chome, Hitachi-shi; Tsuyoshi Niino, 8-12, Osecho-4-chome, Hitachi-shi; Kanehiro Ochiai, 3-3, Hanayamacho-2-chome, Hitachi-shi; Akihiko Shiozawa, 1-1, Jonancho-4-chome, Hitachi-shi; Yuichi Uchiyama, 9-1, Takasuzucho-5-chome, Hitachi-shi; Toyoharu Yasuno, 2-kumi, Higashikaizoe, Usuki-shi; Kenji Moriya, 11-1, Jonancho-4-chome, Hitachi-shi; Shouichirou Kinoshita, 2-1, Jonancho-3-chome, Hitachi-shi; Kazuo Kage, 2038, Izumicho, Izumi-ku, Yokohama; Ryuji Kubota, 1-1, Jonancho-4-chome, Hitachi-shi, all of Japan

[21] Appl. No.: 567,950

[22] Filed: Aug. 15, 1990

Related U.S. Application Data

[62] Division of Ser. No. 98,530, Sep. 18, 1987, Pat. No. 5,011,652.

[30] Foreign Application Priority Data

Mar. 18, 1987 [JP] Japan .................... 62-60949

[51] Int. Cl.$^5$ .............................................. G21C 15/18
[52] U.S. Cl. ......................................... 376/283; 376/299
[58] Field of Search .............. 376/282, 283, 298, 299, 376/314

[56] References Cited

U.S. PATENT DOCUMENTS

| 3,115,450 | 12/1963 | Schanz | 376/283 |
| 4,645,633 | 2/1987 | Hattori | 376/404 |

FOREIGN PATENT DOCUMENTS

| 60395 | 5/1977 | Japan | 376/283 |
| 35890 | 4/1978 | Japan | 376/283 |
| 137596 | 10/1979 | Japan | . |
| 125483 | 9/1980 | Japan | . |
| 69289 | 4/1982 | Japan | 376/283 |
| 116859 | 8/1984 | Japan | . |
| 31091 | 2/1985 | Japan | 376/283 |
| 44687 | 2/1987 | Japan | 376/283 |
| 33697 | 2/1988 | Japan | 376/283 |

OTHER PUBLICATIONS

Nuclear Engineering International, vol. 31, No. 383, p. 13, Jun. 1986.
Nuclear News, Jun. 1986, p. 98.

Primary Examiner—Daniel D. Wasil
Attorney, Agent, or Firm—Antonelli, Terry, Stout & Wands

[57] ABSTRACT

A nuclear reactor facility including a primary containment vessel, a reactor pressure vessel installed in the primary containment vessel and accommodating a reactor core in a lower part thereof, and a vertical cylindrical wall disposed in a lower part of the primary containment vessel around and spaced from the reactor pressure vessel so as to delimit an annular space therebetween. The vertical cylindrical wall has an upper end disposed at a position higher than an upper end of the reactor core and a diaphragm extends substantially horizontally between the upper end of the vertical cylindrical wall and an inner wall of the primary containment vessel for cooperating with the vertical cylindrical wall to separate a space in the primary containment vessel around the reactor pressure vessel into a pressure suppression chamber and a drywell which includes (List continued on next page.)

annular space. The pressure suppression chamber accommodates therein a pool of liquid coolant wherein a level of the liquid coolant of the pool is higher than the upper end of the reactor core. The vertical cylindrical wall has a plurality of vent passages having an upper part at the upper end of the vertical cylindrical wall and exposed to the drywell and a lower part exposed to the pool of the liquid coolant in the pressure suppression chamber. A submergence line and a channel member are also provided.

2 Claims, 18 Drawing Sheets $\delta = 28mm$

NUCLEAR POWER FACILITIES

This application is a divisional of application Ser. No. 098,530, filed Sept. 18, 1987, now U.S. Pat. No. 5,011,652.

BACKGROUND OF THE INVENTION

1. Field of the Invention

The present invention relates to a primary containment vessel for enveloping the core of a nuclear reactor constituted by a light water reactor of the boiling water type, and, more particularly, to a primary containment vessel which permits improvement of its inherent safety through a static cooling system replacing a pressure suppression pool water cooling system and of the economic efficiency by streamlining facilities and equipment.

In addition, the present invention relates to a natural heat-radiating type primary containment vessel which is suitable for cooling the primary containment vessel and/or reducing the emission of radioactive substances at the time of the loss of a coolant.

Furthermore, the present invention relates to a natural heat-radiating type primary containment vessel which is suitable for removing to outside the system by a natural force over an extended period of time thermal energy which is produced by core decay heat released to the primary containment vessel at the time of an emergency when the loss of a coolant has occurred.

The present invention also relates to a nuclear power plant provided with a condensate storage pool in a reactor building.

The present invention also relates to a primary containment vessel reinforcing ring which is suitable for cooling the inside of a primary containment vessel at the time of the occurrence of damage to the piping in the primary containment vessel.

Moreover, the present invention relates to a natural circulation-type nuclear reactor, and, more particularly, to a natural circulation-type nuclear reactor provided with an emergency reactor cooling system which is suitable for use in a boiling water reactor and capable of assuring the cooling of a core by such as maintaining the core immersing water over an extended period of time at the time of the occurrence of a loss-of-coolant accident and/or at the time of an emergency when control rods cannot be inserted.

2. Description of the Related Art

As an example of the prior art, there is a primary containment vessel having a pressure suppression of boiling water reactor facilities, as shown in FIG. 20.

A primary containment vessel 201 envelops a reactor pressure vessel 202, and the upper space therein surrounding the reactor pressure vessel 202 is called a dry well 203, while a container disposed at a lower portion thereof and filled with pool water 204 is called a pressure suppression 205.

The dry well 203 and the pressure suppression 205 are constructed such as to communicate with each other by means of a vent pipe 206. An open end of the vent pipe 206 is immersed in the water of a pressure suppression pool 204 stored in the pressure suppression 205.

In the dry well 203 are disposed the piping containing a high-temperature and high-pressure coolant, machines and instruments of a primary system of the reactor, in addition to the reactor pressure vessel 202. Furthermore, containment spray headers 207 for spray the cooling water are provided in the container 201.

In addition, a residual heat removal pump 208, a residual heat removal system heat exchanger 209 for removing residual heat, and piping from the pressure suppression pool to the spray header 207 via these machines are provided to supply the cooling water to the spray head 207. Furthermore, piping for returning the cooling water from the heat exchanger 209 for removing residual heat to the pressure suppression pool 204 is also provided. Incidentally, reference numeral 210 denotes a building constituting a biological shield.

If an emergency is assumed to have occurred in which the piping of the primary system of the reactor is fractured, the high-temperature, high-pressure coolant of the primary system of the reactor is released into the dry well 203, and a mixture of released steam and water is led to the pressure suppression pools 204 via the vent pipes 206. The released steam is cooled and condensed in the pressure suppression pools 204, thereby suppressing an internal pressure rise of the dry well 203.

When the efflux of the coolant from a fracture is completed, the high-temperature and high-pressure steam inside the primary containment vessel 201 is condensed by operating the spray headers 207, which causes the internal pressure of the primary containment vessel 201 to decrease rapidly.

When the water temperature of the pressure suppression pools 204 rises by the blow-down of steam, the pressure suppression pool water is cooled by the heat exchangers 209 for removing residual heat.

As described above, should the piping of the primary system of the reactor be fractured, when the accident takes place over a short period, the conventional primary containment vessel 201 attains the suppression of pressure by condensation of steam in the water of the pressure suppression pools 204. Meanwhile, when the accident takes place over a long period, the primary containment vessel 201 attains the suppression of pressure by condensation of steam by sprinkling from the spray headers 207 and inhibits a temperature rise of the water of the pressure suppression pool. Since the pressure suppression function in the pressure suppression pool 204 in the former case is constituted by the guiding function of the vent pipes 206 alone, this pressure suppression function is sufficient in ensuring inherent safety as well. On the other hand, to cool the primary containment vessel 201 over a long period of time and cool the pressure suppression pools 204, such dynamic machines as the residual heat removal system pumps 208, the heat exchangers 209, electrically-operated valves, etc., become necessary.

In the above-described conventional example, it has been necessary to retain in the pressure suppression pools a large quantity of water for cooling and condensing steam released at the time of a loss-of-coolant accident, and the heat exchangers for removing residual heat have been necessary for cooling the pressure suppression pools over a long period of time.

In addition, in the primary containment vessel of a boiling water reactor of the above-described conventional art, a residual heat removal system is provided to cope with the removal of core decay heat over a long period of time after the ECCS is operated subsequent to the accident of loss of the coolant and after the core is submerged with water. As a result, there have been drawbacks in that the costs become high, that the pool water containing fission products is led outside the primary containment vessel, and that it is troublesome to carry out, somewhat periodically, the operation test of dynamic machines such as pumps and heat exchangers to check the operation of the machines installed.

In contrast to the pressure suppression pool water-cooling system employing the configuration of dynamic machines and facilities such as the one described above, if as static a heat removing system as possible can be devised as a system having a similar cooling function in place of the facilities which dynamically function, such as rotary equipment, including pumps, large heat exchangers, and large piping loops, it is considered that substantial improvement will be made in the safety and reliability of the system per se through a reduction in the functional requirements for dynamic structural parts, and that the economic efficiency of the plant will be enhanced in conjunction with the streamlining of the facilities per se. As a prior art concerning a cooling system for a primary containment vessel employing such a static system, it is possible to cite a primary containment vessel cooling system based on a heat pipe system disclosed in, for instance, Japanese Unexamined Patent Publication No. (Japanese Patent Application Laid-Open (Kokai) No.) 125483/1980.

The arrangement of this system is such that a multiplicity of cylindrical heat pipes with a low-boiling-point liquid sealed therein are installed on the outer surface of a dry well steel plate of the primary containment vessel. This is a heat removing system in which heat retained in a gas inside the container dry well is statically allowed to escape to outside the primary containment vessel via these heat pipes. It is technically feasible to apply the heat pipes of this idea to the above-described water cooling system of the container pressure suppression pools, and a static safety cooling system can be arranged. However, since the heat pipes with the low-boiling-point liquid incorporated therein are installed as a large-scale structure, the heat pipes substantially affect as obstructions the layout of facilities installed on the outer biological shield wall of the primary containment vessel and an external space thereof. In addition, the structure of this system is bound to become large in size in view of the requirements of antiseismic design are an important facility relating to a safety system. Thus, this system has numerous problems in terms of its facilities, its structure does not have an economic advantage, with the result the system is not very realistic.

As another example of the prior art relating to a similar primary containment vessel cooling system, it is possible to cite a system disclosed in Japanese Unexamined Utility Model Publication No. 11689/1984 in which the primary containment vessel is filled with a liquid by filling the space between a primary containment vessel concrete wall and a liner with the liquid. In this system, however, the gap between the concrete wall and the liner is 2 mm or thereabout, and since the gap is too small to statically cool the pressure suppression pool water with the liquid of this pertinent portion, a circulating flow of the cooling external liquid does not occur. Consequently, this system is so unrealistic that a high static cooling efficiency cannot be obtained, and that it is impossible to expect its effect.

A conventional boiling water reactor plant disclosed in Japanese Unexamined Patent No. 137596/1979 has a condensate storage tank installed outdoors of a reactor building such as to be adjacent to the reactor building and a turbine building. This condensate storage tank is used as a water source for a fuel pool replenishing water system, and a control rod driving hydraulic system, as well as for adjustment of the holding water quantity. In addition, the condensate storage tank is also used as a water source for a cooling system at the time of isolation of the reactor as well as a high-pressure core spraying system, both of which are safety systems.

In a conventional boiling water reactor plant, the condensate storage tank is installed on an antiseismic foundation mat (concrete mat). For this reason, a large amount of concrete is required in structuring a special antiseismic mat described above, so that a long period of time has been necessary in constructing the entire foundation mat of a boiling water reactor plant.

As a structure for injecting cooling water into a primary containment vessel by making use of gravity at the time of a loss-of-coolant accident, a nuclear reactor disclosed in Japanese Unexamined Patent Publication No. 69289/1982 is proposed. As shown in FIG. 21, this reactor is arranged as follows: A core 211 is disposed in such a manner that a cooling water level 214 formed in a cooling water tank 213 is located above a cooling water level 212 formed in a reactor pressure vessel 202 incorporating the core 211. At the time when a loss-of-coolant accident has occurred, separation valves 215, 216 in a piping 214 communicating with a vapor phase portion of the reactor pressure vessel 202 and a cooling water tank 213 are opened to set the pressure of the two spaces at the same level. A pressure relief valve 218 is provided between a main steam pipe 217 and a pressure suppression 205. At the time of an accident when the coolant has been lost, steam inside the reactor pressure vessel 202 is released to a pressure suppression pool 204 via the pressure relief valve 218 so as to decrease the pressure. When the internal pressure of the reactor pressure vessel 202 has been decreased and dropped below that of the cooling water tank 213, separation valves 220, 221 of a piping 219 communicating with the bottom of the cooling water tank 213 and the reactor pressure vessel 202 are opened so as to supply the cooling water contained in the cooling water tank 213 into the reactor pressure vessel 202 by virtue of the operation of gravity.

In addition, the pressure suppression 205 is located above the cooling water level 212 formed inside the reactor pressure vessel 202 so as to be able to constitute an emergency core cooling system of the gravity dropping type. At the time of a loss-of-coolant accident, with the opening of a valve 222, the pool water 204 in the pressure suppression 205 is led into the reactor pressure vessel 202 by means of gravity. A similar structure of a nuclear reactor is disclosed at page 13 of Nuclear Engineering Vol. 31, No. 383 (June, 1986) as well.

This example of the prior art is provided with the pressure suppression 205 above the liquid level 212 inside the reactor pressure vessel 202. At the time of a loss-of-coolent accident, when the supply of the pool water 204 to the reactor pressure vessel 202 by the action of gravity is completed, there is a possibility that the pool water 204 inside the pressure suppression disappears. For this reason, the capabilities of condensing steam introduced by a vent pipe 223 disadvantageously decline.

SUMMARY OF THE INVENTION

Accordingly, a primary object of the present invention is to provide a natural heat-radiating type primary containment vessel which eliminates the use of a heat exchanger for removing residual heat by allowing the heat of the primary containment vessel to escape into the atmosphere through primary containment vessel wall surfaces, and which is capable of effecting cooling for a long period of time after the occurrence of a loss-of-coolant accident.

The aforementioned object can be obtained by expanding an annulus portion between the primary containment vessel and a reactor building, by providing a container-outer-periphery pool with water accommodated therein, by providing a vent pipe communicating with an upper gaseous phase portion of the annulus portion to the outside of the reactor building, and by transferring the heat in the primary containment vessel to the outer-periphery pool through a container wall surface and allowing the heat to escape to the atmosphere.

The characteristic feature of the present invention lies in that heat is transferred from a pressure suppression pool to the outer-periphery pool through the primary containment vessel wall surface without using any driving force, and is ultimately released into the atmosphere. In addition, since the heat inside the primary containment vessel can be allowed to escape to the atmosphere, a residual heat removal system which has hitherto been employed to allow the heat to escape to a sea becomes unnecessary, so that malfunctioning can be overcome and reliability can be improved.

Another object of the present invention is to provide a primary containment vessel which has, as a cooling system for container pressure suppression pool water, a heat removal system which is capable of effecting static cooling for a long period of time with a high heat removal efficiency after the occurrence of an accident, in place of dynamic facilities such as rotary equipment such as a pump, a large heat exchanger, and a large piping loop.

The aforementioned object can be attained by providing a pool area around the outer periphery of a container in a space portion formed between a wet well of the primary containment vessel and a biological shield wall surrounding the same, said pool area being arranged such that a ratio between the depth L of a suppression pool inside the wet well and a gap distance d of a cylindrical portion between the primary containment vessel and a biological shield wall is set to such a value that will facilitate the occurrence of natural circulating flow for enhancing the efficiency of statically cooling the suppression pool water; facilities for injecting non-contaminated water from a water injection tank for injecting the cooling water for the outer-periphery pool through a water injection line; and a vent line provided between a gaseous phase portion of the upper space of the outer-periphery pool and an outside atmosphere portion of reactor facilities and designed to radiate the heat of the heat-sinking outer-periphery pool.

Still another object of the present invention is to provide a natural heat-radiation type container which is capable of effecting cooling for a long period of time after the occurrence of a loss-of-coolant accident without needing to provide a heat exchanger for removing residual heat.

Specifically, the foregoing object can be attained by providing primary containment vessel facilities comprising: a pipeline led from a dry well to the side of a reactor building by penetrating a dry well wall; a partition plate disposed below a penetrating portion of the pipeline and above the water level of the outer-periphery pool and adapted to divide the outer-periphery pool into upper and lower spaces; a discharge channel having an inlet in a gaseous layer in the lower space and led to the outside; and an emergency gas treatment system having an inlet on the inside of the upper space.

The characteristic of the present invention in accordance with this aspect lies in that heat is transferred from a pressure suppression pool to the outer-periphery pool through the container wall surface without needing to use a dynamic driving force, generated steam is ultimately allowed to escape to the atmosphere, and radioactive substances leaking from the container are released after being treated with an emergency gas treatment system.

In the present invention, at the time when the heat inside the primary containment vessel is allowed to escape to the atmosphere, heat is transferred from the wall surface of the reactor pressure vessel made of steel to the outer-periphery pool, and the heat is further transferred to the atmosphere through the steam of the outer-periphery pool, thereby attaining the removal of residual heat without any dynamic equipment.

With respect to the removal of radioactive substances, since these radioactive substances can be treated by the emergency gas treatment system by differentiating the atmosphere leaking from the reactor pressure vessel from steam generated in the clean pool, the capacity of the facilities can be made smaller.

A further object of the invention is to provide a nuclear power plant which is capable of reducing a construction period.

The above object can be attained by providing a nuclear power plant in which an outer-periphery pool disposed between a container and a tubular biological shield surrounding the outer periphery thereof is used as a condensate storage pool.

The outer periphery pool (condensate storage pool) is disposed around the outer periphery of the container, and a water injection pump, a pump driving turbine, a main steam pipe, and a water injection line are arranged in the primary containment vessel and the reactor building.

Consequently, routes of highly important piping in the reactor building, including safety systems such as a reactor isolation cooling system and an emergency core cooling sytem (ECCS), a drive water system such as a control rod driving apparatus, and a fuel pool replenishing water system can be made very short, since the connection of these facilities can be made adjacent to the outer-peripheral pool.

In addition, since the outer-peripheral pool is disposed in an excess space portion formed between the primary containment vessel and the biological shield wall (concrete wall) of the reactor building, the pool is installed on an antiseismic concrete mat in the reactor building. Accordingly, since an antiseismic concrete mat used exclusively for a condensate storage tank required in a conventional reactor plant becomes unnecessary, the amount of placed concrete necessary for the antiseismic foundation mat in accordance with this invention can be reduced substantially, with the result that a period of construction of the foundation mat and, hence, the period of construction of the reactor plant can be reduced.

When an outer-periphery pool having the function of a conventional condensate storage tank is installed in a reactor building, approximately 2000 $m^3$ of more of water is retained in the reactor building. Accordingly, it is necessary to pay consideration to the detection and prevention of water leaking to other facilities, such as an emergency core cooling facilities at the time of leakage of the pool water. The outer-periphery pool has a lining pool structure. In the case where this lining pool structure is adopted, it is readily possible to detect leakage from lining welds, and the like by installing the same facilities as conventional facilities for detecting the leakage of a spent fuel pool. In addition, even when a large amount of water held has leaked due to the large damage to the outer-periphery pool, the biological shield wall functions as a flooding water preventing wall. Therefore, no situation occurs where other equipment that is disposed on portions other than the biological shield wall and is important in terms of safety is subjected to flooding water.

Furthermore, in order to use the outer-periphery pool as substituent facilities for a condensate storage tank, it is necessary to maintain the water quality at a predetermined value. Unlike the suppression pool in the primary containment vessel, the outer-periphery pool is free from the exhausting of a main steam relief safety valve and the inflow of flashing water and the like from a residual heat removal system, with the result that there is no factor deteriorating the water quality. Accordingly, with respect to the water quality of the outer-periphery pool, its cleanness can be maintained sufficiently throughout the life of the plant, so that the outer-periphery pool is capable of sufficiently attaining the function as a condensate storage tank.

A still further object of the present invention is to provide a container reinforcement ring whose mechanical strength is high and which is capable of maintaining the heat radiating characteristics of the outer-periphery pool at a high level.

The aforementioned object can be attained by providing a disk type reinforcement ring which is provided on a container and whose thickness is small at opposite ends thereof and large at a central portion thereof.

In the case of this invention, by providing a reinforcement ring having a small thickness at the opposite ends thereof and a large thickness at the central portion thereof, the strength of a reinforcement ring having an identical sectional area increases against a tensile force caused by the deformation of the container at the time the occurrence of a container-fracture accident, the thickness of the container can be made thinner by that margin.

Consequently, the reinforcement rings are formed into such a configuration as to promote the natural convection. Hence, the relative flow rate of a fluid in the vicinity of the container surface can be increased, which in turn increases the coefficient of heat transfer from the container surface to the water wall, thereby obtaining a high effect of heat removal.

A further object of the invention is to provide a primary containment vessel which is capable of substantially increasing natural heat radiation from the wall of a conventional primary containment vessel and of enhancing the economic efficiency and inherent safety.

The above object can be attained by a means in which a plurality of projections (fins) are disposed on an inner wall of the primary containment vessel.

This means is capable of increasing the area of heat transfer from the projections and of alleviating the hindrance to heat transfer caused by the formation of a film layer on a wall surface by a noncondensible gas (air), with the result that the rate of steam condensation and transfer on the wall surface can be increased. Hence, natural heat radiation from the primary containment vessel wall is promoted.

A further object of the present invention is to provide a nuclear reactor which, at the time of a loss-of-coolant accident, is capable of effecting the condensation of steam released into the container and of maintaining submergence of the core in water.

An additional object of the present invention is to provide a nuclear reactor which is capable of efficiently effecting submergence of a core.

The former object of the present invention can be attained by providing a nuclear reactor comprising: a pressure suppression disposed in the container in such a manner as to surround the outer periphery of the reactor vessel and filled with a coolant in such a manner that a liquid level is formed above an upper end of a core inside the reactor vessel; a submergence line provided with a valve and adapted to introduce the coolant contained in the pressure suppression into the reactor vessel; and a return channel having an opening in a space formed between the reactor vessel and the pressure suppression above the liquid level and communicating with the pressure suppression.

The latter object of the present invention can be attained by adding to the foregoing features a gas discharge pipe communicating with a gaseous phase portion above the liquid level in the pressure suppression and having a valve.

In the case of a loss-of-coolant accident, the coolant inside the pressure supporession is supplied to the primary containment vessel through the submergence line. In addition, the coolant discharged into the container from the fracture at the time of the loss-of-coolant accident and accumulated in a lower portion thereof is led to the pressure suppression by a return channel. Thus, at the time of occurrence of a loss-of-coolant accident, since the coolant circulates from the pressure suppression back to the same via the submergence line, the reactor vessel, the fracture, the container, and the return channel, the steam condensing capabilities by the coolant in the pressure suppression does not decrease, and the submergence of the core by the supply of the coolant into the primary containment vessel can be effected efficiently.

In addition, according to the feature of the latter, since the gas in the gaseous phase in the pressure suppression is released to the outside by means of the gas discharge pipe, the coolant accumulating in the lower portion of the container can be introduced efficiently into the pressure suppression via the return channel. Consequently, since the coolant level of the pressure supporession is increased, the action for supplying the coolant into the primary containment vessel increases.

Another object of the present invention is to provide an emergency core cooling system which, by combining a pressure relief valve in the reactor pressure vessel and a plurality of tanks having pressurized water or boric acid water, is capable of reducing the number of dynamic machines and equipment and of thereby improving the reliability, and which has an effective combination for safely shutting down the core and cooling the same at the time of a loss-of-coolant accident and should control rods be incapable of being inserted.

The foregoing object can be attained by the following two points;

1) The number of dynamic machines and equipment is reduced and the reliability is enhanced by combining pressure relief valves and pressurized tanks, or tanks disposed above the pressure vessel in of gravity drop.

2) A measure is taken to cope with a loss-of-coolant accident or a case where control rods are incapable of being inserted by adopting a suitable combination of pressure tanks and gravity-drop water tanks and by filling some tanks with boric acid water.

By adopting a suitable combination of pressure relief valves and pressurized tanks or gravity-drop water tanks, the pressure relief valve is opened at the time of the occurrence of a loss-of-coolant accident to allow the steam in the pressure container to be released to decrease the internal pressure of the reactor pressure vessel, and by lowering the pressures of the respective tanks to their working pressures, the water in the pressurized tank and then the water in the gravity-drop tank can be consecutively injected into the reactor pressure vessel. In this injection, since the natural force of the pressure of the tank or gravity drop is employed, reliability can be improved as compared with the injection of water using a pump.

In addition, since boric acid water is filled in some tanks among the plurality of tanks, boric acid water can be injected into the pressure vessel in the case where the control rod(s) cannot be inserted, thereby making it possible to safely shut down the reactor.

BRIEF DESCRIPTION OF THE DRAWINGS

The foregoing and other objects, features, and advantages of the invention will be apparent from the following more particular description of preferred embodiments as illustrated in the accompanying drawings in which same reference characters refer to the same or similar parts throughout the various views. The drawings are not necessarily to scale, emphasis instead being placed upon illustrating the principles of the invention.

DESCRIPTION OF THE PREFERRED EMBODIMENTS

Figure 1:
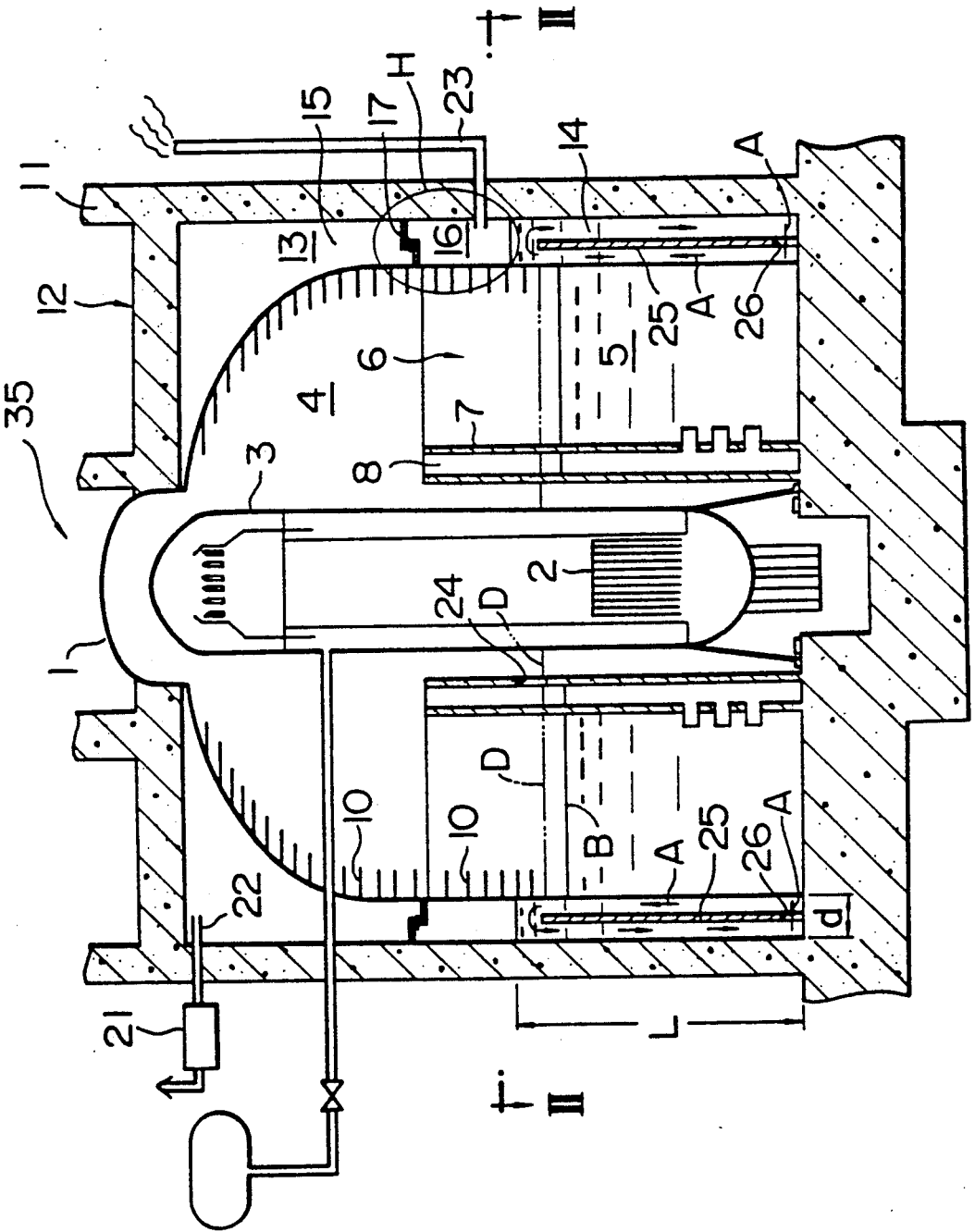
FIG. 1 is a cross-sectional diagram of nuclear reactor facilities in accordance with a preferred embodiment of the present invention.
Figure 2:
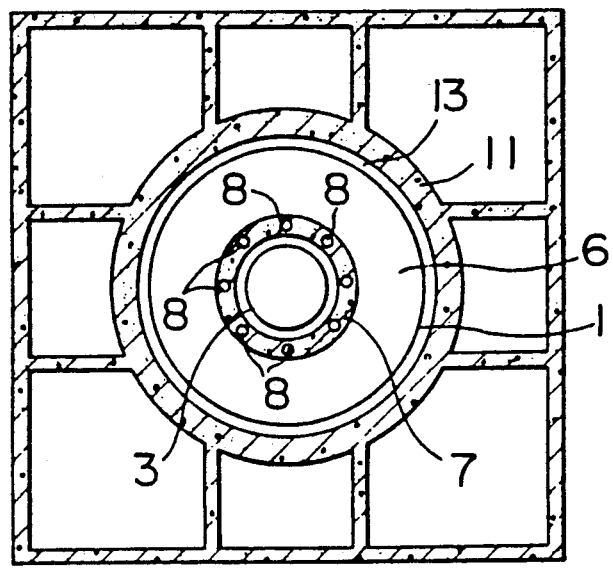
FIG. 2 is cross-sectional view taken along the line II—II of FIG. 1.
Figure 3:
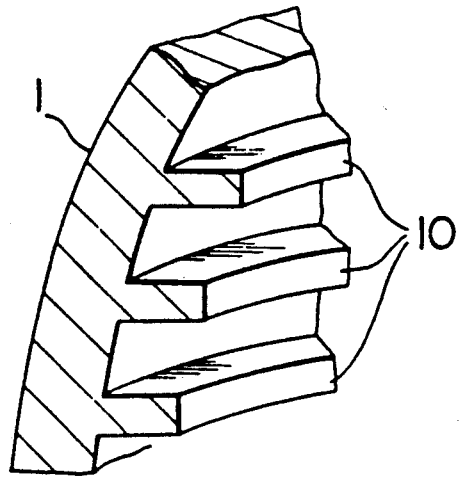
FIG. 3 is a diagram illustrating fins provided on an inner surface of a primary containment vessel shown in FIG. 1.
Figure 4:
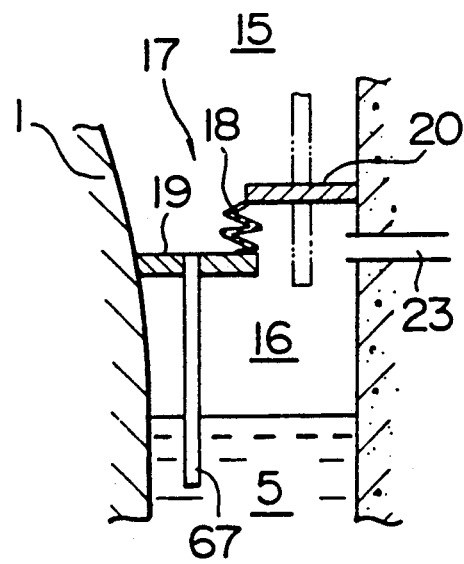
FIG. 4 is an enlarged diagram of a region shown by H in FIG. 1.

Referring now to FIGS. 1 to 7, description will be made of a first preferred embodiment of the present invention.

In FIGS. 1 to 7, a natural radiation type container 1 of a boiling water reactor envelops a reactor pressure vessel 3 accommodating a core 2 which generates heat by fission reaction, and a dry well 4 in which the piping and machines and equipment of a primary system of the reactor are disposed as well as a pressure suppression or a wet well 6 accommodating a pressure suppression pool (water) 5 are formed by being defined by a vent wall 7. The dry well 4 and the pressure suppression 6 communicate with each other by means of a plurality of vent pipes 8 formed in the vent wall 7. A multiplicity of heat-radiating fins 10 are formed on a portion of the inner surface of the container 1 and a portion thereof surrounding an upper gas phase portion 9 of the pressure suppression 6. Incidentally, a core spraying hole 24 is formed at a position above a normal water level B of the pressure suppression pool 5 on the dry well 6 side of the vent pipes 8.

An outer peripheral pool 14 in which water is accommodated is formed in an annulus portion 13 between the primary containment vessel 1 and a reactor building 12 having a biological shield wall 11. This container outer peripheral pool 14 is capable of enhancing heat radiation from the wall surface of the container 1 and has a water level L which is higher than that of the pressure suppression pool 5 so that, in the case of an accident, the volume of water that can be left as it is for a fixed period of time (e.g., 3 days) after the accident can be secured. Incidentally, since the peripheral wall of the annulus portion 13 is watertight, there is no possibility of water leaking to the reactor building 12.

Figure 14:
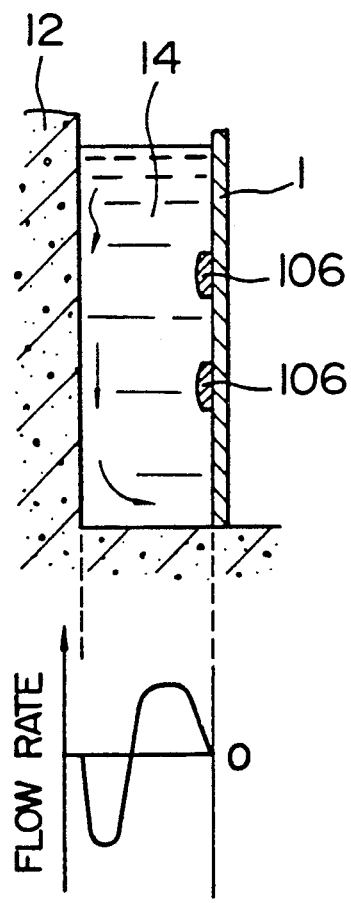
FIG. 14 is a diagram explaining the effect of a reinforcing ring on the circulation of outer peripheral pool water.
Figure 15:
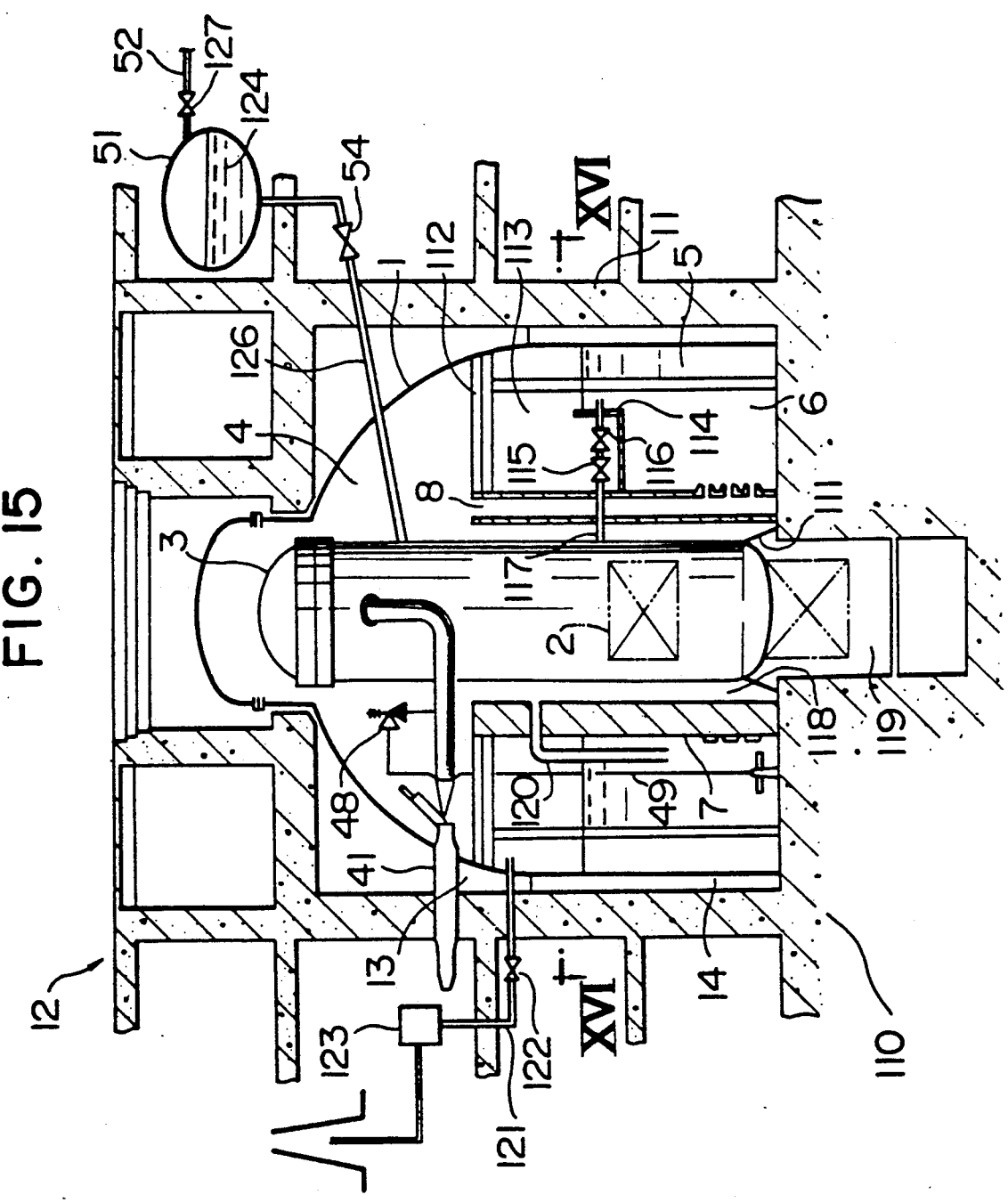
FIG. 15 is a schematic cross-sectional view of still another modification of the reactor facilities in accordance with the present invention.
Figure 16:
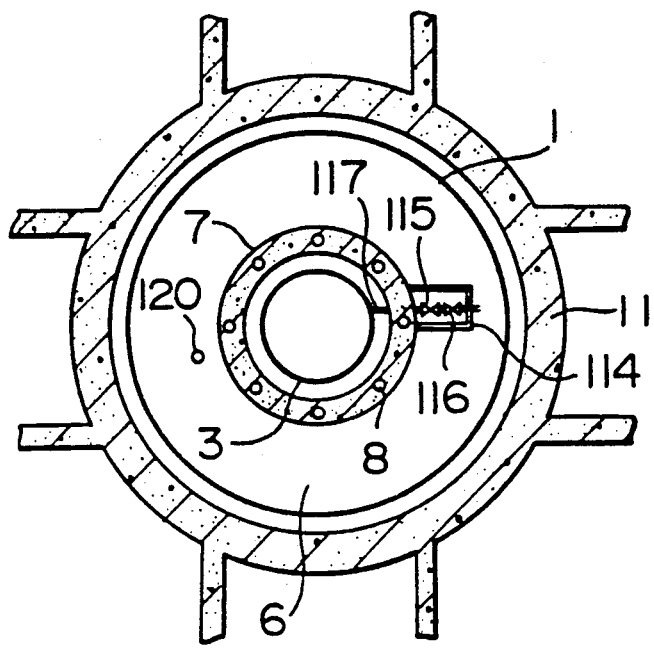
FIG. 16 is a cross-sectional view of the reactor facilities taken along the line XVI—XVI of FIG. 15.

A partition plate 17 defining the annulus portion 13 into upper and lower spaces 15, 16 is provided in the annulus portion 13. This partition plate 17 is preferably composed of two annular plates 19, 20 movably connected to each other by means of bellows 18, as shown in FIG. 14, so as to absorb a difference in the positional change caused by a difference in thermal expansion between the building 12 side and the container 1 side or strain occurring at the time of an earthquake.

The upper space 15 above the partition plate 17 communicates with the outside by means of the piping 22 with a filter 21 capable removing radioactive substances provided in the midway thereof, while the space 16 which is not contaminated by the radioactive substances between the partition plate 17 and the outer peripheral pool 14 communicates with the outside of the reactor building 12 via a vent pipe 23. The arrangement is such that, at the time of the occurrence of a loss-of-coolant accident, the radioactive substances are released only to the space 15 by focusing the piping penetrating the primary containment vessel 1 in the upper space 15, and the radioactive substances released to the space 15 can be removed by the filter 21. Incidentally, since the gas or steam from the space 16 which is not actually contaminated by radioactive substances can be released to the outside without going through the filter 21, there is no possibility of an excessive filtration load being applied to the filter.

A central partition plate 25 for allowing or promoting the convection and circulation A of the outer peripheral pool water is disposed in the outer peripheral pool 14, and a hole 26 which permits the convection and circulation A is formed in a lower portion of the central partition plate.

Incidentally, if it is assumed that the depth of the pool water in the outer peripheral pool 14 is L, and that the radial width of the pool 14 is d, these parameters are selected such as to be $d/L \geq 0.15$ in order to assure sufficient circulation of the pool water.

In order to ensure $d/L \geq 0.15$, in the case of the primary containment vessel 1 in which the depth of the suppression pool 5 is, for instance, approximately 6 meters, the gap d of the outer peripheral pool 14 is set to 0.9 meter or above. If a gap of this extent is provided between the primary containment vessel 1 and the biological shield wall 11, the construction and setup of the primary containment vessel 1 and the biological shield wall 11 can be undertaken simultaneously in executing construction work. Hence, this arrangement is beneficial to a reduction in the period of constructing the reactor building 12.

The reason for setting the gap so that $d/L \geq 0.15$ will be explained below in greater detail.

Figure 6:
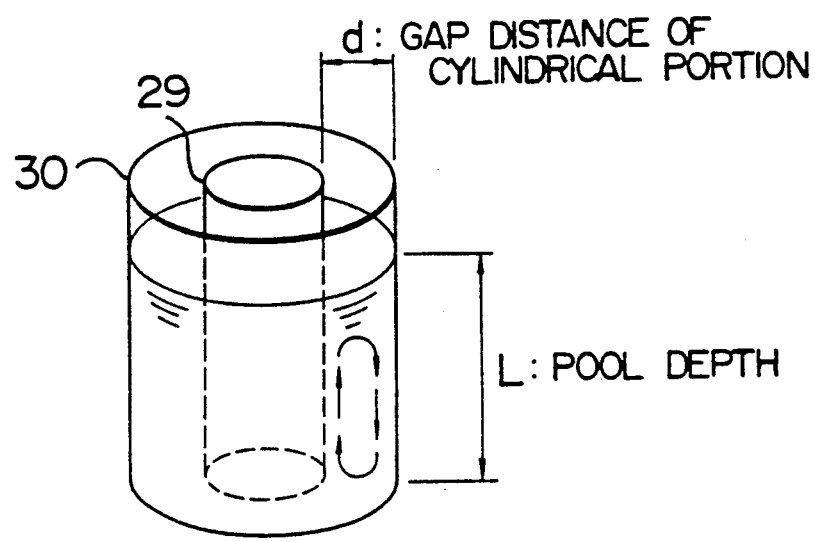
FIG. 6 is a diagram illustrating the basic principle of convection and circulation characteristics of an outer peripheral pool of the facilities shown in FIG. 1.

FIG. 6 schematically illustrates the outer peripheral pool for the primary containment vessel. In the double cylinder structure illustrated in the drawing, an inner cylinder 29 is the reactor container 1, while an outer cylinder 30 is the outer peripheral pool of the present invention surrounded by the primary containment vessel 1 and the shield wall 11. The level of the outer peripheral pool water is set to a water level equivalent to or higher than that of the pressure suppression pool water in order to improve thermal conductivity through the reactor container wall surface. However, in order to effect it is efficient to produce a circulating flow of the outer peripheral pool 14 as much as possible so as to effect static cooling as in the case of the present invention. However, in cases where the gap distance d of the cylindrical portion is small, it is generally difficult for the aforementioned natural circulation flow to occur, so that an effective cooling system cannot be obtained.

Figure 7:
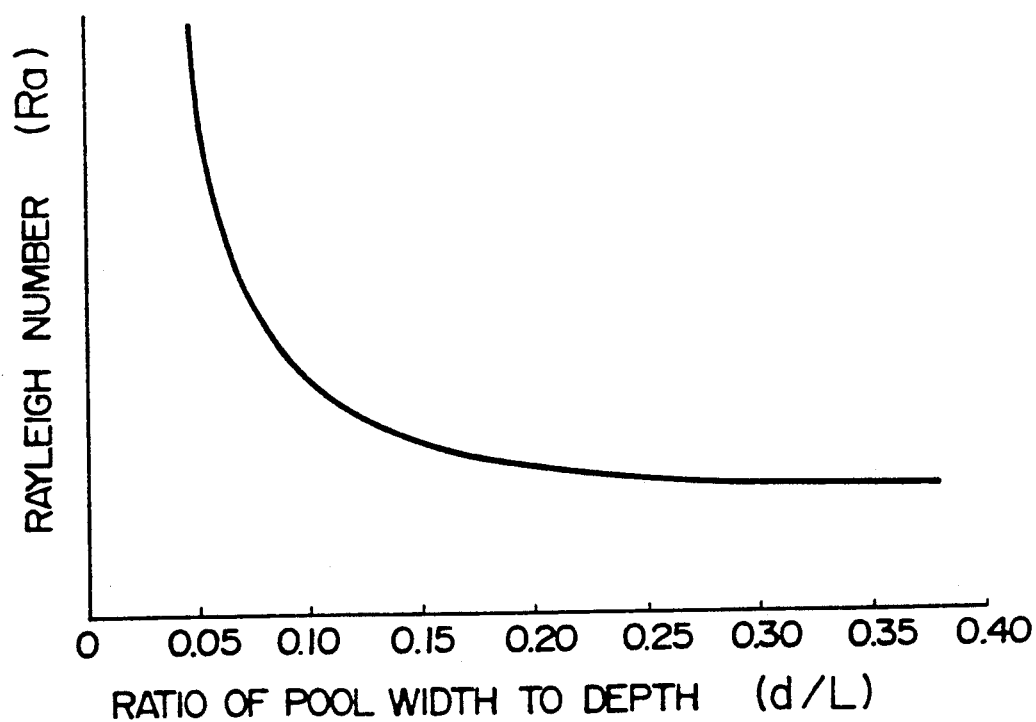
FIG. 7 is a graph illustrating the relationships between d/L and Ra.

Meanwhile, in FIG. 7, the tendency of occurrence of natural circulation flow in the gap portion of the double cylinder 29, 30 having a heat source in the inner cylindrical portion 29 which is experimentally determined by way of general consideration is expressed as a function of d/L, i.e., the ratio of the cylindrical portion gap distance d to the suppression pool depth L. In the graph, Ra, or a Rayleigh number is an index which indicates the ease with which the circulation flow is produced, and means that the lower its numerical value, the more the natural circulation flow is liable to be produced and the higher the heat removing efficiency is. As shown in the graph, it was found that, when the value of d/L is less than 0.15, the Rayleigh number is large, so that the natural circulation flow is difficult to occur. Therefore, it is considered effective to set the value of d/L, i.e., the ratio of the suppression pool water depth L to the outer peripheral pool gap distance d to 15/100 or above.

Figure 5:
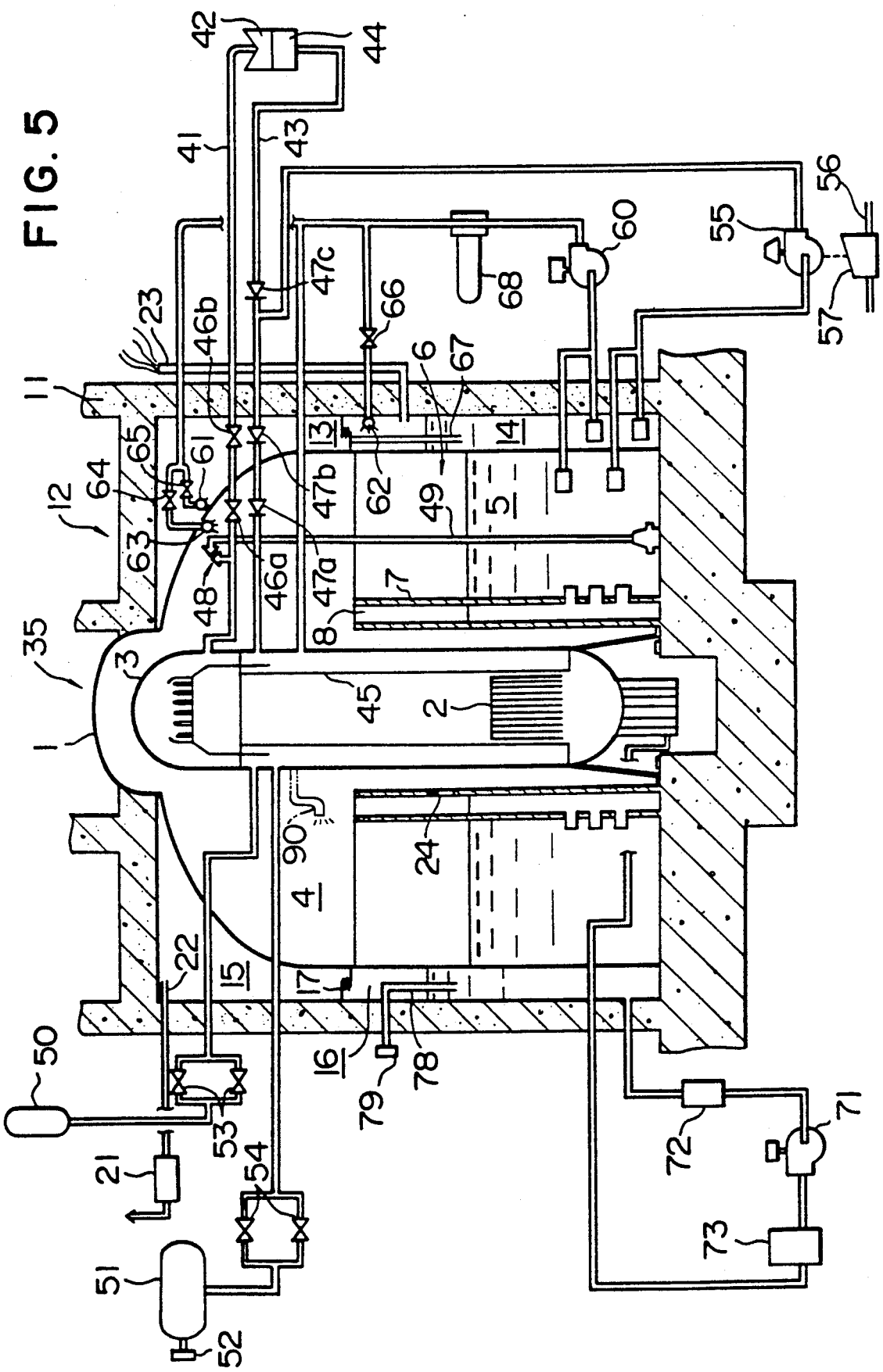
FIG. 5 is a diagram illustrating the piping of reactor facilities shown in FIG. 1.

Referring mainly to FIG. 5, detailed description will be made of the piping system of nuclear reactor facilities 35 in accordance with this first embodiment.

A main steam pipe 41 introduces steam from the pressure container 3 to a generating turbine 42. A feed water 43 receives water condensed by a condenser 44 from steam issued from the turbine 42, and returns it to the outside a shroud 45 inside the reactor pressure vessel 3. The water introduced into the pressure vessel 3 passes along the outside of the shroud 45, reaches the lower portion of the core 2, is converted into steam on receiving heat from the core 2, and is sent out from the steam pipe. Incidentally, reference numerals 46a, 46b denote valves, while 47a, 47b, 47c denote one-way valves.

A pressure relief valve 48 disposed in the main steam pipe 41 allows steam to escape in the event that the internal pressure of the reactor pressure vessel 3 has become abnormally high, thereby controlling the internal pressure of the reactor pressure vessel 3 to be kept within a predetermined range. Steam released from the pressure relief valve is led via a vent pipe 49 into the pressure suppression pool 5 inside the pressure suppression 6, where it is condensed.

Reference numerals 50, 51 denote a high-pressure water tank of 5-10 atmospheres and a low-pressure water tank of 2-5 atmospheres, respectively, which are disposed above the core 2 inside the reactor pressure vessel 3 and allow the core 2 to be charged with water by the gravity-drop of water at the time of a loss-of-coolant accident (LOCA). For instance, boric acid water is accommodated in the high-pressure water tank. Reference numeral 52 denotes a feed water line, while references 53, 54 denote valves.

A pump 55 is operated by a turbine 57 which is driven by steam imparted from the main steam pipe 41 to a pipe 56 at the time of an emergency (in a case where condensation and feeding of water is stopped for some reason or other after a reactor shutdown), and supplies the water of the outer peripheral pool 14 and the pressure suppression pool 5 to the feed water pipe 43, thereby constituting a reactor core isolation cooling (RCIC) system for promoting the cooling of the core 2 by charging of water.

Reference numeral 60 denotes a pump for constituting a residual heat removal (RHR) system. The pump 60 is used to spray water from at least one of the outer peripheral pool 14 and the pressure suppression pool 5 uniformly to the outside of the primary containment vessel 1 by means of sprays 61, 62 so as to promote the cooling of the container 1 by increasing heat conductance in and outside the container 1, and inside the dry well 4 in the container 1 by means of a spray 63 so as to cool steam inside the dry well 4. Reference numerals 64, 65, 66 denote valves. Incidentally, water sprayed inside the chamber 13 is introduced to the outer peripheral pool 14 via a pipe 67, while water sprayed in the dry well 4 is introduced into the pressure suppression pool 5 via the vent pipes 8.

Reference numeral 68 denotes a heat exchanger for cooling, and the water of the outer peripheral pool 14 and the pressure suppression pool 5 which has been cooled by the heat exchanger 68 can be returned to its original positions by means of piping (not shown).

Reference numeral 71 denotes a pump for a hydraulic control system for controlling the position of control rods by making use of the water of the outer peripheral pool 14. Reference numeral 72 denotes a filter, while numeral 73 denotes a drive control unit for control rods.

Reference numeral 78 denotes a replenishing pipe for adjusting the liquid level of the outer peripheral pool 14 by means of feed water of gravity-drop type from a feed water line 79 connected to an outer peripheral pool water tank (not shown) via a valve which is adapted to be opened by an accident signal.

Next, before describing the various cooling operations of the reactor facilities 35 shown in FIGS. 1 to 7, description will be made of the cooling operation of a multiplicity of fins 10 projecting from the inner wall of the container 1 with reference to FIGS. 8A, 8B, 8C, and 8D.

The natural heat radiation type primary containment vessel 1 is characterized in that a plurality of projections (fins) are provided on the inner wall of the primary containment vessel opposing the gas phase portion so as to attain the removal of core decay heat from the wall of the primary containment vessel over a long period of time by virtue of natural heat radiation.

The gas phase portion of the primary containment vessel 1 after the loss of the coolant is filled with a mixture of high-temperature and high-pressure steam and the initially existent air. In the steam condensating process on the primary containment vessel wall surface, there has been a tendency that a thin film of noncondensable air is formed on a condensing surface, thereby appreciably declining the coefficient of condensation heat transfer.

This is attributable to the fact that a laminar flow region in which an atmosphere stagnates in the vicinity of the condensing surface is formed, and a noncondensable gas accumulates in this region.

Therefore, the plurality of projections (fins) having the configuration of No. 4 of Table 1 are provided on the inner wall of the primary containment vessel 1. This arrangement makes it possible to increase the area of heat transfer between the atmosphere inside the primary containment vessel 1 and the wall of the container 1 being affected by the accumulation of heat on the condensing surface, thereby increasing natural heat radiation from the container space portions.

Depending on the configuration of the steam condensing surface (i.e. heat transfer surface), it is possible to avoid the effect of the aforementioned thin layer of air and to increase the stream heat transfer characteristics.

TABLE 1

(Relationships Between the Configuration of Heat Transfer Surface and Heat Transfer Characteristics)

| No. | 1* | 2* | 3 | 4** |
|---|---|---|---|---|
| Configuration of heat transfer surface | (Low-temperature side)<br><br>(———)<br>(———)<br><br><br>(High-temperature side) | (Low-temperature side)<br><br>(⌒)<br>(⌒)<br>(⌒)<br><br>(High-temperature side) | (Low-temperature side)<br><br>(⌣)<br>(⌣)<br><br><br>(High-temperature side) | (Low-temperature side)<br><br>(———)<br>(⊓ ⊓)<br><br><br>(High-temperature side) |
| Heat transfer performance | X~Δ (small)~(medium) | X (small) | ○ (large) | ⊚ (very large) |

*denotes the configuration of a wall surface of a conventional container.
**denotes the configuration of a wall surface of the container of this invention.

Figure 8A:
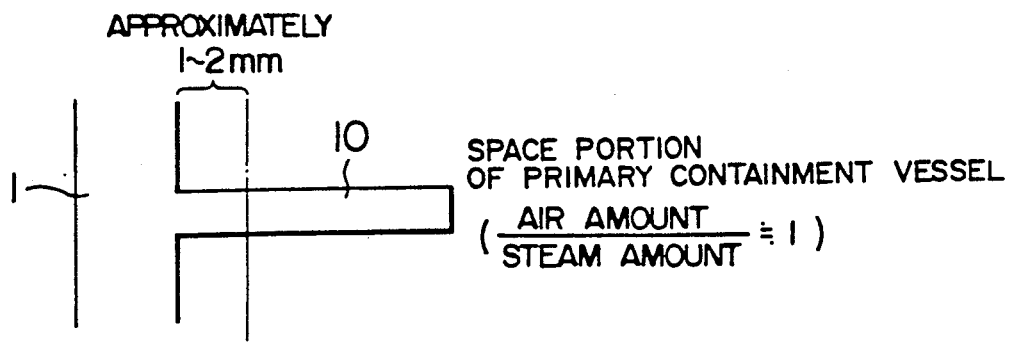
FIGS. 8A, 8B, 8C, and 8D are a diagram and graphs illustrating the effect of fins provided on the inner surface of the primary containment vessel shown in FIG. 1 on heat radiation.
Figure 8B:
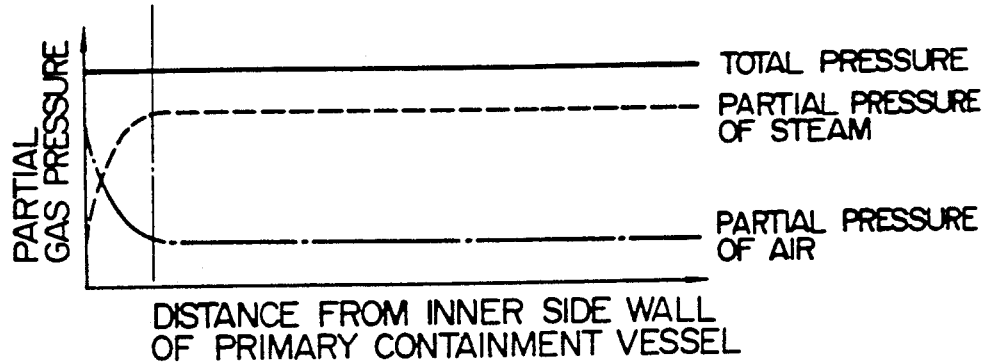
Figure 8C:
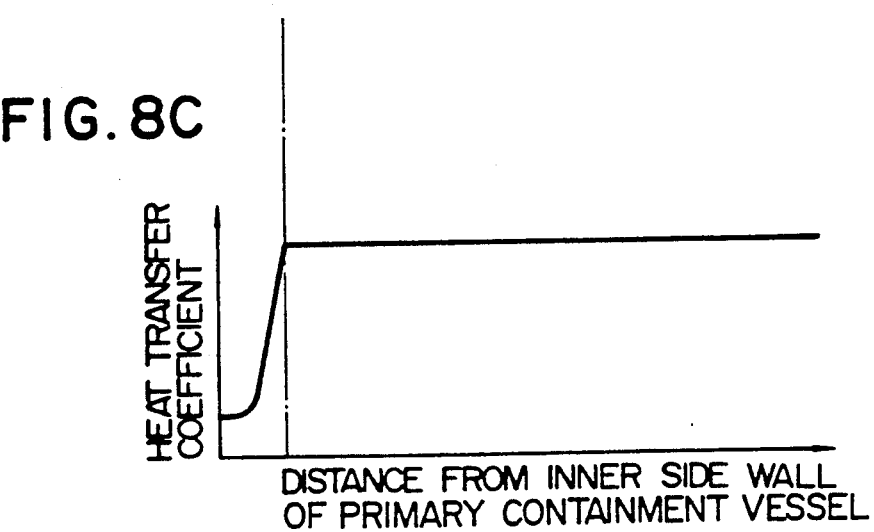
Figure 8D:
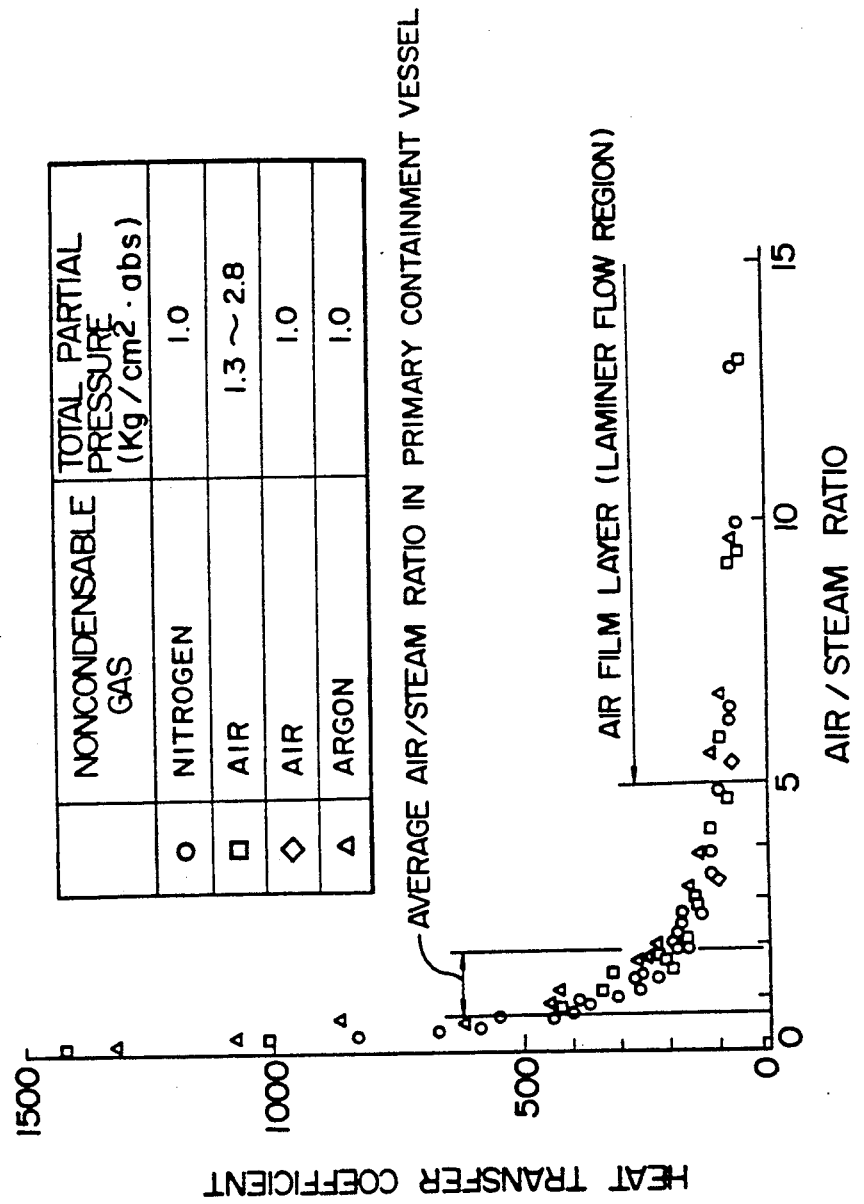

Referring now to FIGS. 8A, 8B, 8C, and 8D, description will be made of the heat transfer improvement effect derived from the projections (fins). When consideration is made of heat transfer between an atmosphere in which a high-temperature noncondensable gas (air) and steam are present in a mixed form (the amounts of air and steam are practically equivalent in the atmosphere inside the reactor container after the loss-of-coolant accident) and the low-temperature-side steam condensing surface (reactor container), an uniformly mixed atmosphere of air and steam (the atmosphere is activated since the coolant released from the fracture serves as a driving force) migrates to the steam condensing surface, and steam is condensed, with resultant good heat transfer. However, a portion of air in the atmosphere which has a poor heat transfer rate stagnates on the steam condensing surface and thereby forms a very thin laminar flow region. Because of the presence of this thin layer of air, heat transfer between the mixed atmosphere of air and steam and the steam condensing surface is effected only through the diffusion of steam via the thin layer of air, with the result that heat transfer is extremely deteriorated. In terms of the relationships between the ratio of the air amount to the steam amount and a heat transfer rate, it is known that the heat transfer rate becomes deteriorated when the proportion of the air amount is increased, as shown in FIGS. 8C and 8D.

Since the above-described air film is formed in a laminar region formed in close proximity to the steam condensing surface, if projections are formed on the condensing surface, the air film is not formed on the surface of the projections. (No problem will be presented even if there is a possibility of a region with a poor heat transfer rate being left in marginal portions at the roots of the projections.)

In this invention, by making use of the effect of the above-described projections (fins) 10, effective heat transfer between the region of air/steam mixed atmosphere and the projections (fins) 10 is promoted, and the area of heat transfer is increased by means of the projections (fins) 10, thereby promoting natural heat radiation from the inner wall of the primary containment vessel.

Next, description will be made of the operation of the nuclear reactor facilities 35 in cases where an accident of breakage of the primary piping or machines and equipment inside the dry well 4 has occurred.

In this case, the internal temperature and pressure of the dry well 4 of the primary containment vessel 1 rise suddenly owing to the high-temperature and high-pressure steam released from a fracture 90 of the primary piping. The atmosphere or steam inside this dry well 4 is released into and condensed in the pool water 5 inside the pressure suppression 6 via the vent pipes in the vent wall 7. Accordingly, a rise in the internal pressure of the dry well 4 can be suppressed.

If this state continues, the temperature of the water of the pressure suppression pool 5 continues, but since a difference between the water temperature of the pressure suppression pool 5 and that of the outer peripheral pool 14 increased in conjunction with the rise in the water temperature of the pressure suppression pool 5. Accordingly, an amount of heat transferred from the suppression pool 5 to the outer peripheral pool 14 increases, thereby making it possible to suppress a rise in the water temperature of the pressure suppression pool 5. Incidentally, in the reactor facilities 35, water is accommodated in or supplied to the outer peripheral pool 14 in such a manner that the requirement of $d/L \geq 0.15$ is met in the outer peripheral pool 14. At the same time, the annular central partition plate 25 is provided in the outer peripheral pool 14. Consequently, the circulation of water is carried out positively in the outer peripheral pool 14, and the heat transfer and radiation in the outer pool 14 can be conducted effectively.

When the water temperature of the outer peripheral pool 14 continues to rise by the heat transfer to the outer pool 14, the boiling or evaporation of the water of the outer pool 14 starts, and then heat is absorbed, with the result that the heat of the outer peripheral pool 14 is removed. In addition, heat removal is also effected through the heat transfer from the water level of the outer peripheral pool 14 to the gas phase section 16. Heat transmitted to the gas phase section 16 is released outside the building 12 in the form of relatively high-temperature steam through natural convention in the gas phase section 16 and finally via the vent pipe 23.

Meanwhile, in the reactor facilities 35, the heat-radiating fins 10 for reducing the obstruction of heat transfer by an air film layer and for increasing the heat transfer area are disposed on the inner wall of the reactor vessel 1 surrounding the gas phase portions of the dry well 4 and the pressure suppression 6. Therefore, the reactor decay heat released into the gas phase portions of the dry well 4 and the pressure suppression 6 is effectively transmitted to the wall of the container 1 by virtue of the fins 10, and can be naturally radiated to an outer gas phase portion 15 from the wall of the container 1. This heat is released outside the building 12 via the filter 21 to remove radioactive contaminants in the steam which may possibly be released into the gaseous phase 15 depending on an accident.

Accordingly, even when no residual heat removal (RHR) system is provided, heat radiation can be effected, and the intrinsic safety can be enhanced as a result.

In the reactor facilities 35, since a residual heat removal (RHR) system comprising the pump 60, the sprays 61, 62, 63, etc. is provided, the heat transfer coefficient of the wall surface of the container 1 can be enhanced by means of the sprays 61, 62, 63 of the RHR, and the cooling of the container 1, the outer peripheral space 15, the outer peripheral space 16, and the dry well 4 is promoted. Incidentally, the water released into the chamber 15 by the spray 61 is in some cases sent to the outer peripheral pool 14 via the pipe 67 together with water-soluble radioactive contaminants released into the chamber 15.

It should be noted that the inner spray 63 on the container 1 not only functions as a spray of the RHR but is also capable of filling the dry well 4 with water up to a water level sufficient to submerge the core 2 in water. Accordingly, the operation of injecting cooling water into the dry well 4 by this spray 63 is capable of preventing the exposure of the core 2 when the injection of the cooling water by an emergency core cooling system (ECCS) is stopped.

In addition, in cases where an arrangement is provided such that only the outer peripheral pool 14, for instance, out of the suppression pool 5 and the outer peripheral pool 14, is adopted as an intake source for the pump 60 of the RHR, the spray line may not be cooled by the heat exchanger 68 if it is within the range in which the removal of heat from the outer peripheral pool 14 can be effected sufficiently.

In the event that a loss-of-coolant accident (LOCA) has occurred in which the coolant inside the reactor pressure vessel 3 flows out owing to the rupture of the primary piping of the reactor facilities 35 and in which the core 2 may be exposed by the decay heat at the core 2 unless water is sprayed ot the core 2, since the reactor core isolation cooling (RCIC) system comprising the pump 55, the turbine 56, etc., are provided, it is possible to pour water into the reactor pressure vessel 3 even when the internal pressure of the reactor pressure vessel 3 is high, by driving the turbine 57 by using a part of the reactor steam, by driving the pump 55, and by pouring the water of the suppression pool 5 and/or the outer peripheral pool 14 into the reactor pressure vessel 3.

After the internal pressure of the pressure container 3 is lowered by releasing the high-pressure steam inside the pressure container 3 into the pressure suppression 6 via the pressure relief safety valve 48, the core 2 is completely submerged in water by pouring water into the reactor pressure vessel 3 from the high-pressure water tank 50 and the lower-pressure water tank 51 both located at positions higher than the reactor pressure vessel 3.

A boiling water reactor is arranged in such a manner that, if the condition of the reactor deviates from that of normal operation, control rods are inserted and the operation of the reactor is thereby stopped. In the event that the control rods cannot be inserted, the nuclear reaction inside the core 2 is suppressed since voids normally increase. In the reactor facilities 35, even if the reaction rate due to the voids is 0 or negative with a small absolute value, the operation of the reactor can be stopped safely by pouring boric acid water from the high-pressure water tank 50 after operating the safety valve 48 to lower the pressure.

Incidentally, in this example, the large-capacity lower-pressure water tank 51 can be used to maintain the submergence of the core 2, and the small-capacity high-pressure water tank can be used for controlling the output of the core 2, it is possible to optimize the capacity of the lower-pressure tank 50 to a level necessary for submergence of the core and the capacity of the high-pressure tank 51 to an amount of boric acid water for safely stopping the reactor.

Accordingly, in the reactor facilities 35, the submergence of the reactor 2 can be realized positively.

In addition, since the core submergence hole 24 is provided at the position of the vent tube 11 which is higher than the normal water level of the suppression pool 5, at the time of a loss-of-coolant accident, cooling water is poured into the reactor pressure vessel 3, as described above, by the operation of an emergency core cooling system (ECCS), but poured water flows out from a fracture and stays in the dry well 4 and the pressure suppression 6. At thin juncture, since the dry well 4 and the pressure suppression 6 are communicated with each other by the core submergence hole 24, the water level inside the dry well 4 and that of the pressure suppression 6 coincide and assume the level of D. At this juncture, since the core 2 is at a position lower than the water level D of the pool water, even after the pouring of water by the emergence core cooling system (ECCS) is completed, the core 2 can be cooled over a long period of time.

Description will now be made of specific heat removing capabilities of the reactor facilities 35 in accordance with one preferred embodiment of the present invention.

Table 2 shows a comparison of the amount of heat removed from the wall of the space portion of the primary containment vessel 1 as between the case where the projections (fins) 10 are adopted and the case where they are not.

From this table, it can be seen that the amount of heat removed from the space portion in the case where the projections (fins) 10 are disposed is approximately 2- to 10-fold in comparison with the case where they are not.

TABLE 2

| Item | Conventional example | This invention |
|---|---|---|
| Installation of fins | absent | present |
| Heat transfer area | $A_0$ | $A_1 = (1.5\sim3) \times A_0$ |
| Heat transfer coefficient | $h_0$ | $h_1 = (2\sim5) h_0$ |
| Amount of heat removed | $\theta_0$ | $\theta_1 = (2\sim10) \theta_0$ |

Figure 9A:
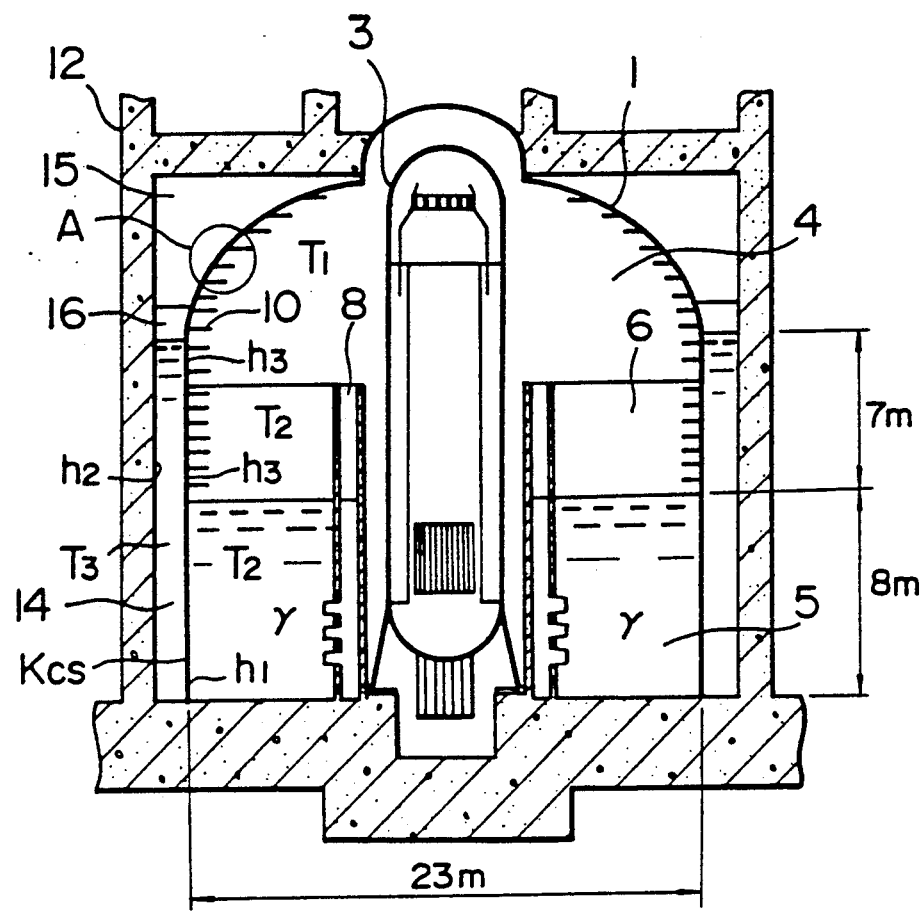
FIGS. 9A and 9B are cross sectional views of facilities illustrating the conditions for calculating the effect of the fins provided on the inner surface of the primary containment vessel on heat radiation.
Figure 9B:
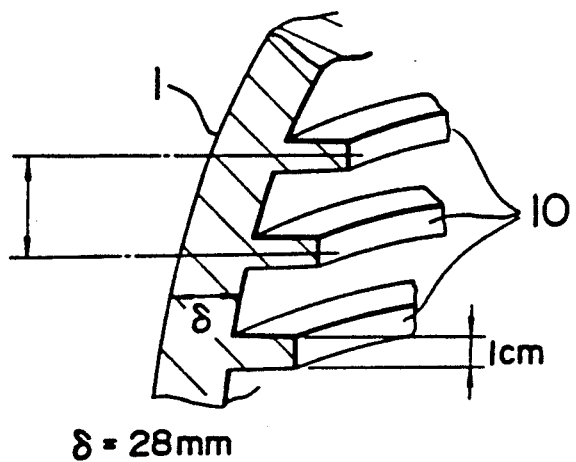

$A_0 = 500 \, m^2$,
$A_1 = 1250 \, m^2 \rightarrow A_1/A_0 = 2.5$
$h_0 = 100 \, Kcal/m^2 \cdot h \cdot °C.$,
$h_1 = 440 \, Kcal/m^2 \cdot h \cdot °C. \rightarrow h_1/h_0 = 4.4$
$Q_0 = 1.2 \times 10^6 \, Kcal/hr$,
$Q_1 = 5.4 \times 10^6 \, Kcal/hr \rightarrow Q_1/Q_0 = 4.5$ Specific evaluation of heat radiation based on FIGS. 9A and 9B is described below.

A specific example of evaluation in a case where the configuration, dimensions and number of the projections (fins) are assumed to be as follows.

(1) Evaluation of amount of Heat Radiation from Space Portion Wall

① Heat transfer area
 a) In cases where projections 10 are absent ($A_0$)

$$A_0 = \pi \cdot 23.7 \div 500 \, m^2$$

b) In cases where projections 10 are present ($A_1$)

No. of projections $N = \dfrac{7}{0.03} = 230$ pcs.

Surface area per projection ($A_F$):

$$A_F = \dfrac{\pi}{4} \cdot \{23^2 - (23 - 2 \cdot 0.02)^2\} \times 2 +$$

$$\pi \cdot (23 - 2 \cdot 2.02) \cdot 0.01 \approx 4 \, m^2$$

Container wall surface area ($A_p$)

$$\begin{aligned} A_p &= 230 \cdot \{\pi \cdot 23 \cdot (0.03 - 0.01)\} \\ &= 330 \, m^2 \end{aligned}$$

Hence $A_1 = 230 \cdot 4 + 330 = 1250 \, m^2$
$A_1/A_0 \approx 2.5$

Incidentally, in FIGS. 9A and 9B, $T_1$-$T_3$, $h_1$-$h_3$, $K_{CS}$, and $\gamma$ are shown in Table 3.
$T_1 = 130° \, C.$,
$T_2 = 130° \, C.$,
$T_3 = 100° \, C.$,
$h_1 = 640 \, Kcal/m^2 \cdot h \cdot °C.$,
$h_2 = 620 \, Kcal/m^2 \cdot h \cdot °C.$,
$h_3 = 440 \, Kcal/m^2 \cdot h \cdot °C.$,
$K_{cs} = 140 \, Kcal/m^2 \cdot h \cdot °C.$,
$\gamma = 0.0002 \, h \cdot m^2 \cdot °C/Kcal.$ ② Heat transfer coefficient ($h_3$)
 a) In cases where projections are absent $(h_3)_0 \div 100 \, Kcal/m^2 \cdot h \cdot °C.$ (From FIG. 8D)

b) In cases where projections are present

Projections: $(h_3)_1 = 440 \, Kcal/m^2 \cdot h \cdot °C.$
 (From FIG. 8D)

Container wall: $(h_3)_0 = 100 \, Kcal/m^2 \cdot h \cdot °C.$
 (From FIG. 8D)

$(h_3)_1/(h_3)_0 \approx 4.4$

Amount of heat radiation
 a) In cases when projections are absent ($A_0$)

$Q_0 = U_0 \cdot (T_1 - T_3) \cdot A_0$ where $$\begin{aligned} \dfrac{1}{U_0} &= \dfrac{1}{h_3} + \gamma + \dfrac{\delta}{K_{cs}} + \gamma + \dfrac{1}{h_2} \\ &= \dfrac{1}{100} + 0.0002 + \dfrac{0.028}{140} + 0.0002 + \dfrac{1}{620} \end{aligned}$$

Hence, $U_0 \div 80 \, Kcal/h \cdot m^2 \cdot °C.$ $$Q_0 = 80 \cdot (130 - 100) \cdot 500$$
$$= 1.2 \times 10^6 \text{ Kcal/hr.}$$

b) In cases where projections are present ($Q_1$)

Container wall:

$$(Q_1)_0 = 80 \cdot (130 - 100) \cdot 330$$
$$= 7.9 \times 10^5 \text{ Kcal/hr.}$$

Projections:

$$(Q_1)_1 = U_1 \cdot (T_1 - T_3) \cdot A_F \cdot N \cdot$$
$$= \frac{1}{U_0} + \frac{1}{h_3} + \gamma + \frac{\delta}{K_{cs}} + \gamma + \frac{1}{h_2}$$
$$= \frac{1}{440} + 0.0002 + \frac{0.028}{140} + 0.0002 + \frac{1}{620}$$
$$= 4.486 \times 10^{-3}$$

Hence, $U_1 \doteq 220$ Kcal/hr.
Fin Efficiency $\phi \doteq \tan\text{-}h \cdot u_b / u_b$ $$u_b = \omega \cdot \sqrt{\frac{a}{\lambda \cdot y_b}}$$
$$= 0.02 \sqrt{\frac{400}{40 \cdot 0.005}}$$
$$\approx 0.89$$

Hence, $\phi = 0.8$ $$(A_1)_1 = 220 \cdot (130 - 100) \cdot 4 \cdot 230 \cdot$$
$$\approx 6.0 \times 10^6 \text{ Kcal/hr.}$$

$$Q_1 = \{(Q_1)_0 + (Q_1)_1\} \times \phi$$
$$= (7.9 \times 10^5 + 6.0 \times 10^6) \times 0.8$$
$$= 5.4 \text{ c } 10^6 \text{ Kcal/hr.}$$

Hence, $Q_1/Q_0 = 4.5$ (2) Evaluation of amount of heat radiation from pool wall ($Q_p$)

$$A_p = \pi \cdot 23 \cdot 8 \ 580 \ m^2$$

$$A_p = U_\omega \cdot (T_1 - T_2) \cdot A_p$$

where $$\frac{1}{U_\omega} = \frac{1}{h_1} + \gamma + \frac{\delta}{K_{cs}} + \gamma + \frac{1}{h_2}$$
$$= \frac{1}{640} + 0.0002 + \frac{0.028}{140} + 0.0002 + \frac{1}{620}$$
$$= 3.77 \times 10^{-3}$$

Hence, $U_\omega = 265$ $$A_p = 265 \cdot (130 - 100) \cdot 580$$
$$= 4.6 \times 10^6 \text{ Kcal/hr.}$$

Figure 10:
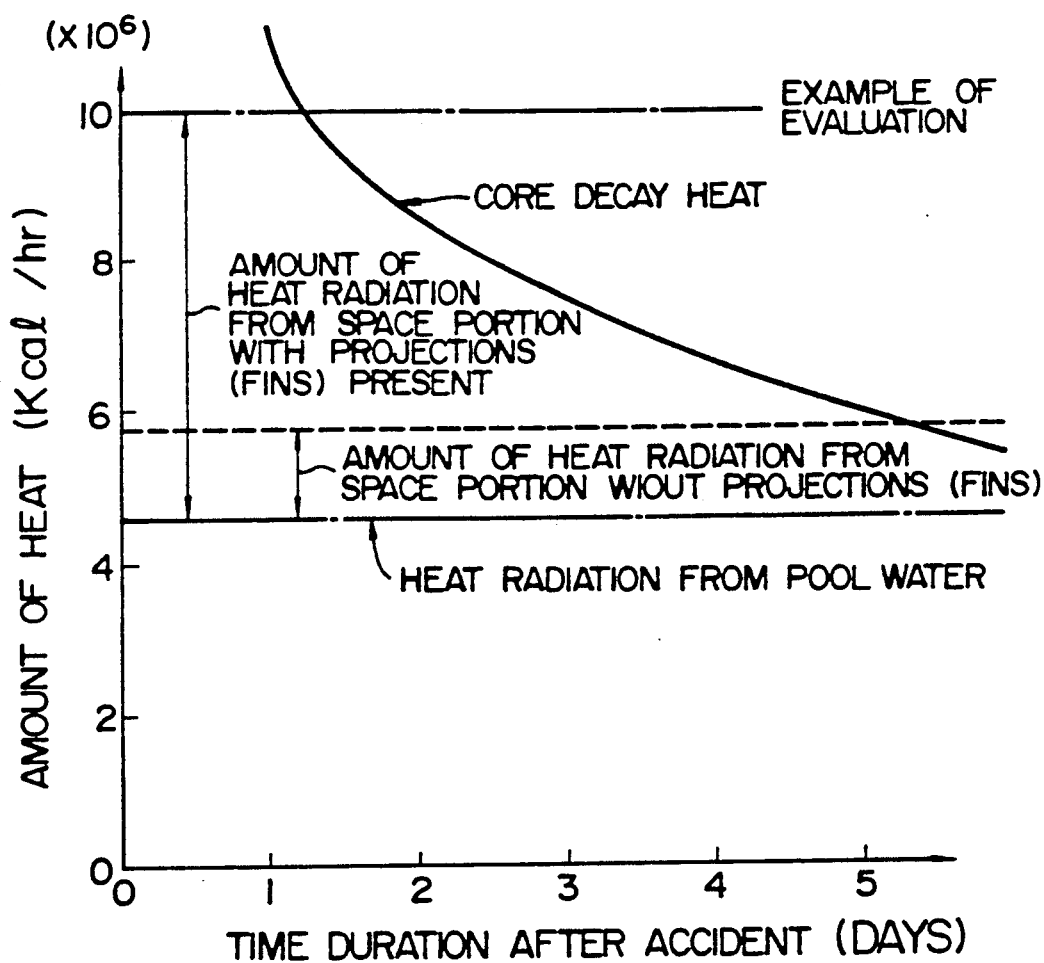
FIG. 10 is a graph illustrating the results of the calculation.
Figure 10A:
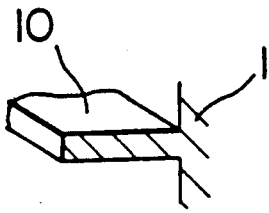
FIGS. 10A, 10B, 10C, 10D, 10E, 10F, 10G, and 10H diagrams illustrating modifications of the fin.
Figure 10B:
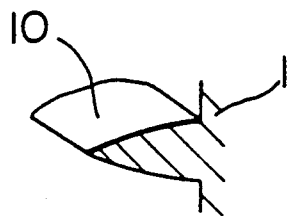
Figure 10C:
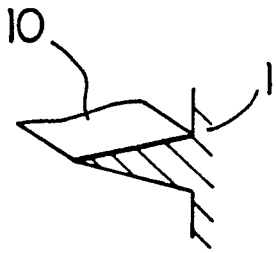
Figure 10D:
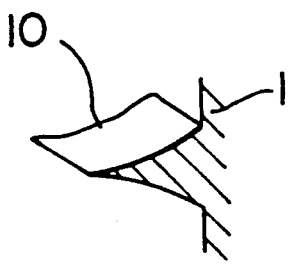
Figure 10E:
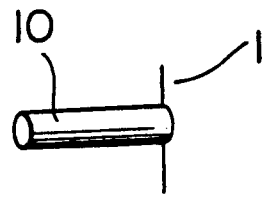
Figure 10F:
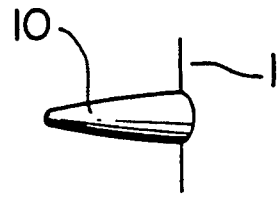
Figure 10G:
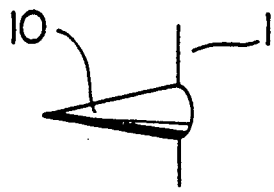
Figure 10H:
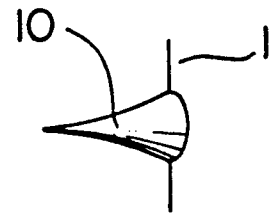

In addition, FIG. 10 shows the relationships between an example of evaluation of the amount of heat removal ($4.6 \times 10^{-6}$ Kcal/hr.) from the suppression pool water to the outer peripheral pool one the one hand, and the core decay heat (May—W:H according to the presently allowed analytical condition). In the case of the conditions assumed here, with this amount of heat removal, it is impossible to obtain an effect sufficient to completely remove the core decay heat through natural heat radiation. However, if this amount of heat removal from the pool water 14 and the amount of heat removal from the space portions 15, 16, the combined amount of heat removal balances with the core decay heat in one day after the accident, as shown in FIG. 10. Subsequently, since the amount of heat removal exceeds the core decay heat, the temperature of the inside of the primary containment vessel 1 decreases.

Accordingly, if the fins 10, such as those shown in FIG. 9B, are formed on the inner surface of the container 1, it is possible to remove the decay heat occurring in the core even if a residual heat removal system is not provided.

As another example, the projections may be formed into the configurations shown in FIGS. 10A, 10B, 10C, 10D, 10E, 10F, 10H. (FIGS. 10A–10D correspond to the cross sections of FIGS. 10E–10H, respectively.)

Figure 11:
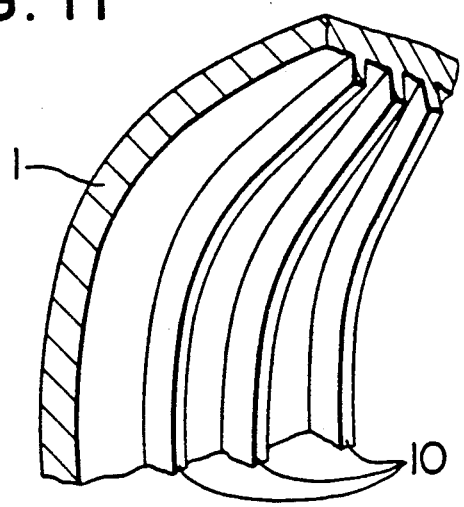
FIG. 11 is a diagram illustrating an example in which the fins provided on the inner surface of the primary containment vessel are extended vertically.

Incidentally, instead of forming the fins 10 horizontally on the inner surface of the reactor 1, the fins 10 may alternatively formed such as to extend vertically, as shown in FIG. 11.

Figure 12:
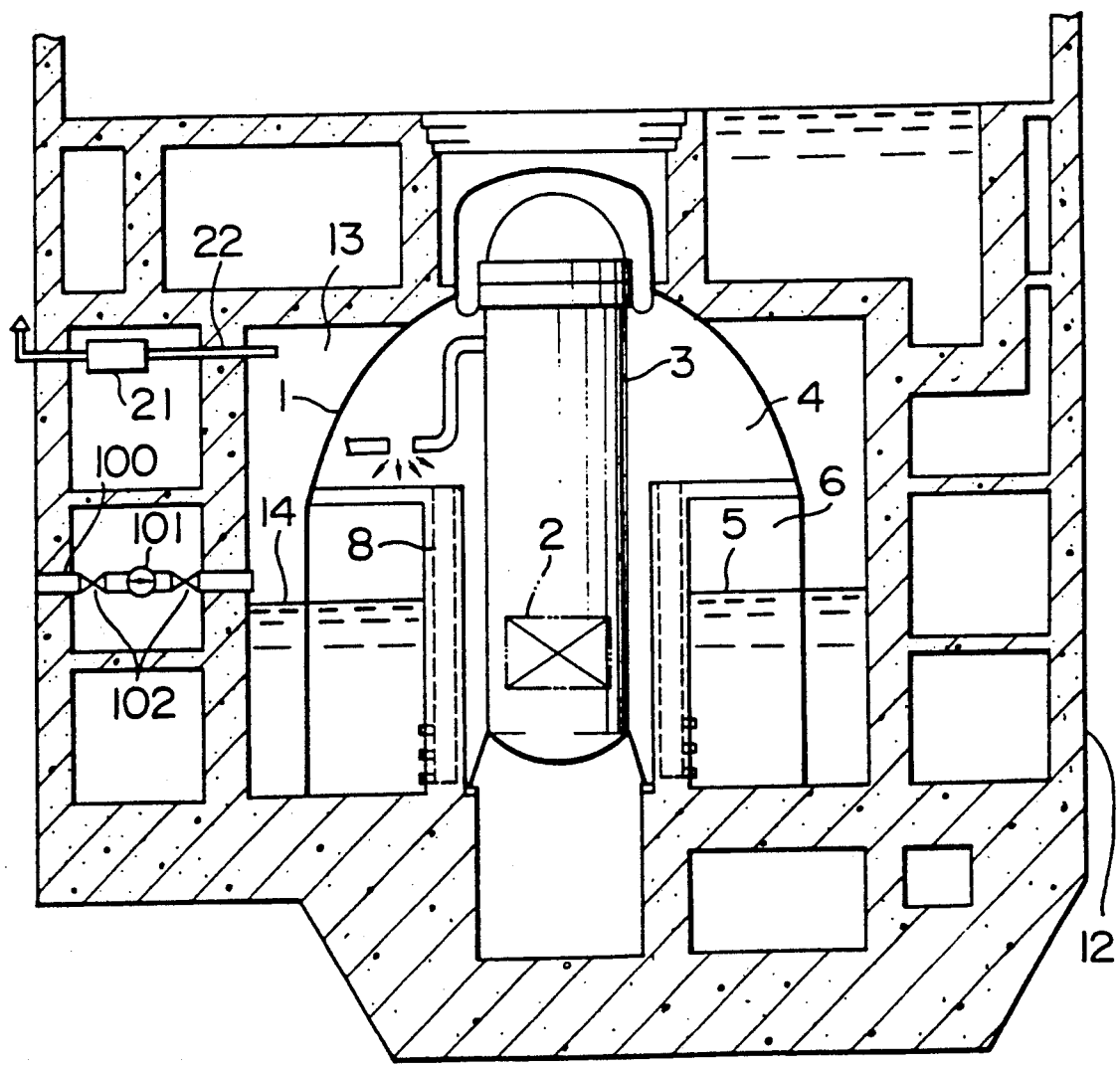
FIG. 12 is a schematic cross-sectional view of a modification of the reactor facilities in accordance with the present invention.

In addition, as shown in FIG. 12, an arrangement is provided such that a duct 100 which is capable of taking in the air from outside the reactor building 12 is provided at a lower gaseous phase portion of the annulus portion 13, and a fan 101 and a check valve 102 are provided therein. In the event that a loss-of-coolant accident has occurred, if the operator opens the check valve 102 and starts the fan 102, it is possible to send the outside air to the annulus gaseous phase portion 13 to cause the air in the gaseous phase portion 13 to be circulated forcedly, thereby making it possible to improve heat transfer from the outer peripheral pool 14 of the reactor container and the wall surface of the primary containment vessel 1. Consequently, it is possible to accelerate heat removal from the primary containment vessel 1.

In this example, since a partition plate is not provided, steam and the like from the chamber 13 are released from the piping 22 via the filter 21.

Figure 13:
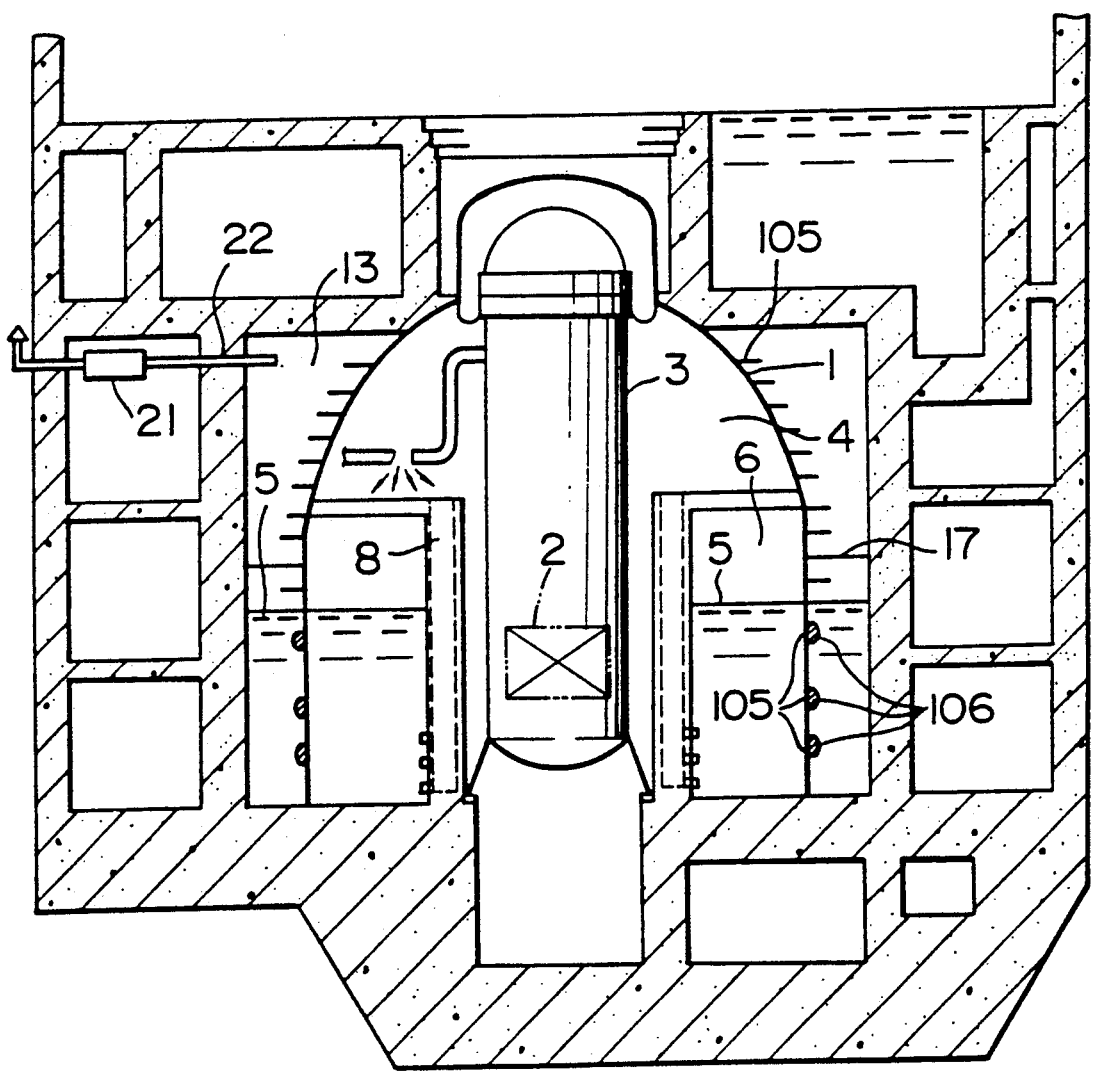
FIG. 13 is a schematic cross-section view of another modification of the reactor facilities in accordance with the present invention.

In addition, as shown in FIG. 13, fins 105 may be provided on the outer surface of the primary containment vessel 1 so as to increase the amount of heat transfer from the wall surface of the primary containment vessel 1. This arrangement makes it possible to increase the heat transfer area, thereby allowing the heat removal effect to be improved.

Incidentally, in this case, those fins 105 that are immersed in the pool water 14 are preferably formed by thin ring-like members whose central portions have a greater thickness and whose opposite edge portions have a smaller thickness, such as those shown by reference numeral 106 in FIG. 13, so that the natural convection in the outer peripheral pool 14 will not be hampered, as shown in FIG. 14.

Rings 106 of such a configuration can constitute reinforcement rings for the container 1.

In other words, a small boiling water plant has pool water 5 inside the primary containment vessel 1, but the water level of the outer peripheral pool 14 of the container is higher than the water level of the pressure suppression pool 5 by virtue of the adoption of a water wall. For that reason, an external force is applied to the container 1 by the water wall. However, the water level of the pool 14 around the outer periphery of the container 1 drops when the water in the outer peripheral pool 14 of the container 1 is consumed for removal of decay heat so as to cool the container 1 at the time of an accident. Consequently, a change takes place in the state of pressurization in which the pressure suppression 6 is pressurized from the outside by the water of the pool 14, and an outwardly oriented force is applied to the wall of the pressure suppression 6 by means of the pressure of steam filled in the container 1 and the hydraulic pressure caused by the water in the pressure suppression pool 5.

If the reinforcement rings 106 are disposed as shown in FIG. 13, even if the water in the pool 14 around the container 1 is lost, the strength of the container 1 can be maintained by the reinforcement rings 106.

Furthermore, assuming that the reinforcement rings 106 are thin-walled plates and have a very short length and if all of them are in an elastic deformation-prone area, provided that the sectional areas of the reinforcement rings are fixed, high reliability can be obtained since the resistance to stress increases if they are paded in portions close to the center of the rings.

In the case of the example shown in FIG. 13, the reinforcement rings 106 having the same sectional areas as those of disk type reinforcement rings 106 give a high strength, and their reinforcement effect is high, so that the thickness of the container can be made thinner by that margin.

Incidentally, as for the number of the reinforcement rings 106, two or more or four or more may suffice, and the reinforcement rings 106 alone may be provided when the fins 105 are not provided.

Referring now to FIGS. 15 to 18, description will be made of the structure of a reactor in accordance with another preferred embodiment of the present invention by taking a boiling water reactor as an example.

The reactor pressure vessel 3 is installed in the primary containment vessel 1. The pressure suppression 6 with the pool water 5 filled therein surrounds the reactor pressure vessel 3 inside the primary containment vessel 1. The reactor pressure vessel 3 and the pressure suppression 6 are disposed on the same concrete mat 110. The reactor pressure vessel 3 is installed on the concrete mat 110 via a skirt 111. The pressure suppression 6 is constituted by the tubular vent wall 7 (the side wall of the pressure suppression 6), a diaphragm floor 112, and a lower portion of the primary containment vessel 1. The diaphragm floor 112 is installed on an upper end portion of the vent wall 7 and the side wall of the primary containment vessel 1. The vent wall 7 opposes the reactor pressure vessel 3 and surrounds the same. A plurality of vent passages 8 are provided in the vent wall 7 so as to communicate with the upper dry well 4 disposed in an upper portion of the primary containment vessel 1 as well as the pool water 5 in the pressure suppression 6. A gas space (wet well) 113 is formed above the level of the pool water 5 inside the pressure suppression 6. The level of the pool water 5 is located above the upper end of the core 2 installed in the reactor pressure vessel 3.

A surrounding wall 114 is provided on the vent wall 7 inside the pressure suppression 6. The surrounding wall 114 is constituted by a U-shaped side wall and a bottom. The upper ends of the U-shaped side wall are located above the level of the pool water 5. The pool water 5 does not enter the surrounding wall 114. A core submergence valve 115 and a check valve 116 are disposed in the space inside the surrounding wall 114 and are installed in a submergence pipeline 117. The submergence pipeline 117 penetrates the vent wall 7 and the surrounding wall 114 so as to communicate the pressure vessel 3 and the pool water 5 in the pressure suppression 6. The position of an opening of the submergence pipeline 117 in the pool water 5 is above the upper end of the core 2. A submergence apparatus is thus constituted by the core submergence valve 115, the check valve 116, and the submergence pipeline 117.

An annular space 118 is formed between the reactor pressure vessel 3 and the vent wall 7. A lower dry well 119 is formed below the pressure container 3 in the concrete mat. The annular space 118 communicates with the upper dry well 4 and the lower dry well 119. A return line 120 provided by penetrating the vent wall 7 is open to the annular space 118 above the level of the pool water 5 and below the diaphragm floor 112. The other end of the return line 120 is open in the pool water 5.

A main steam pipe 41 is connected to the reactor pressure vessel 3. A relief safety valve 48 is installed in the main steam pipe 41 in the dry well 4. An exhaust pipe 49 connected to the relief safety valve 48 penetrates the diaphragm floor 112 and is open in the pool water 5 inside the pressure suppression 6.

The primary containment vessel 1 is installed in a reactor building and is surrounded by a biological shield wall (concrete wall) which is a part of the reactor building. The pool 14 which is disposed around the outer periphery of the container and is filled with cooling water is formed in a lower portion of the annular space 13 (surrounding the pressure suppression 6) formed between the primary containment vessel 1 and the biological shield wall 11.

A gas discharge pipe 121 communicated with the gas space 113 in the pressure suppression 6 is connected with a discharge cylinder provided outside the reactor building 12 via a valve 122 and a filter 123 for removing radioactive substances.

An accumulator water tank is provided in the reactor building 12 above the apex portion of the reactor pressure vessel 3. Cooling water 124 is filled in the accumulator water tank 51. A pressurizing means (not shown) such as a bomb is communicated with the gaseous phase portion above the level of the cooling water 124 in the accumulator water tank 51. The gaseous phase portion in the accumulator water tank 51 is constantly pressurized at a pressure (e.g. 20 atmospheres) lower than a rated pressure (70 atmospheres) in the reactor pressure vessel 3 by means of the pressurizing means. The accumulator water tank 51 is communicated with the reactor pressure vessel 3 by means of a water injection pipe 126 having a valve 54. Furthermore, a cooling water supply pipe 52 having a valve 127 is connected to the accumulator water tank 51.

In the event that the main steam pipe 41 or a local portion of the reactor pressure vessel 3 is ruptured in the primary containment vessel 1, the cooling water in the reactor pressure vessel 3 is injected in the form of steam into the region of the primary containment vessel 1 such as the upper dry well 4. This is the loss-of-coolant accident. The loss-of-coolant accident is detected by the fact that the water level (measured by a level meter) in the reactor pressure vessel 3 has reached a predetermined level or below and that the pressure (measured by a pressure gauge) in the primary containment vessel 1 has reached a predetermined level or above. When the loss-of-coolant accident is detected, a separation valve (not shown) disposed in the main steam pipe 41 is closed quickly, an automatic vacuum system is operated to open the relief safety valve 48, which the valve 125 is opened by a detection signal thereof. The steam inside the reactor pressure vessel 3 is released into the pool water via the exhaust pipe 49 and is condensed therein. Consequently, the internal pressure of the primary containment vessel 3 is lowered. The water injection pipe 126 is provided with a check valve (not shown) to prevent a reflux of the fluid from the reactor pressure vessel 3 to the accumulator water tank 51. When the internal pressure of the reactor pressure vessel 3 drops below a predetermined level (e.g. 20 atmospheres), the cooling water 124 inside the accumulator water tank 51 pressurized to 20 atmospheres is injected into the reactor pressure vessel 3 via the water injection pipe 126. A decrease in the cooling water in the reactor pressure vessel 3 is suppressed by the injection of the cooling water 124. Since the cool cooling water is injected into the reactor pressure vessel 3, the internal pressure of the reactor pressure vessel 3 is further declined.

The steam released into the upper dry well 4 is released into the pool water 5 in the pressure suppression chamber 6 via the vent passages 8 and is condensed therein. The noncondensable gas which is present in the upper dry well 4 is also led to the pool water 5 together with the steam. This gas is not condensed and is gathered in the upper gas space 113.

The temperature of the pool water 5 rises owing to the condensation of steam lead via the vent passages 8 and the exhaust pipe 49. The heat held by the pool water 5 is transmitted to the cooling water in the pool 14 via the reactor container 1. As a result, the temperature rise of the pool water 5 is suppressed, and the steam condensing capabilities are sustained more than in the case of the prior art. The cooling water in the pool 14 is heated by the above-described heat transfer and is turned into steam. This steam (not shown) is released to the outside via the vent passages communicated to the annular space 13. Replenishing water is supplied from the outside to compensate for a reduction in the cooling water in the pool 14.

Part of the steam released to the upper dry well 4 is condensed by spray water released from a sprayer (not shown) provided in the upper dry well 4, and stays in the lower dry well 119 and the annular space 118.

When a loss-of-coolant accident is detected and a predetermined time duration lapses, the valve 122 is opened by a controller (not shown). Consequently, the gas inside the gas space 113 where the pressure is high is released to the outside from the exhaust cylinder via the gas release pipe 121. At the time of this release, radioactive substances contained in the gas are removed by the filter 123 for removing radioactive substances. This release of the gas causes the internal pressure of the gas space 113 to decline. After the valve 122 is opened, and after an elapse of a predetermined time duration, the aforementioned controller opens the core submergence valve 15. When the core submergence valve 115 is opened, the pool water 5 is supplied into the reactor pressure vessel 3 via the submergence pipeline 117 using as a driving source a difference in the head up to the level of the pool water 5. The controller is set in such a manner that the opening the core submergence valve 115 is effected when the internal pressure of the reactor pressure vessel 3 is lowered to a predetermined level close to the atmospheric pressure. The check valve 116 is designed to prevent the reflux into the pressure suppression 6. The accumulator water tank 51 is designed to cool the core by injection of cooling water over a short period, while the submergence apparatus is designed to cool the core by the injection of cooling water over an extended period.

The cooling water which has flown out from the fructure is accumulated in the lower dry well 119, as described before. Part of this cooling water is returned to the pressure suppression 6 via the return line 120. Since the internal pressure of the gas space 113 is lowered by the release of gas in the gas space 113, the introduction of cooling water into the pressure suppression 6 via the return line 120 can be effected efficiently. In other words, even if the gas release pipe 121 is not especially provided, the supply of cooling water to the pressure suppression 6 by means of the return line 120 is carried out. However, in comparison with a case where the gas release pipe 121 is provided and the gas in the gas space 113 is released, the supply of cooling water to the pressure suppression 6 by means of the return line 120 can be suppressed more. In addition, the release of the gas in the gas space 113 promotes the supply of cooling water by means of the return line 120, so that the level of the pool water 5 rises more, and the supply of cooling water into the reactor pressure vessel 3 is also promoted.

Since, at the time of a loss-of-coolant accident, a circulating channel constituted by the submergence line 117, the reactor pressure vessel 3, the fracture, the annular space 118, the return line 120, and the pressure suppression 6 is formed, this embodiment makes it possible to cool the core with the cooling water in the pressure suppression chamber 6 over a long period of time.

The submergence apparatus in this embodiment is required to meet the conditions described below so that the core will not be exposed at a time of about half a day after the detection of the loss-of-coolant accident.

Figure 17:
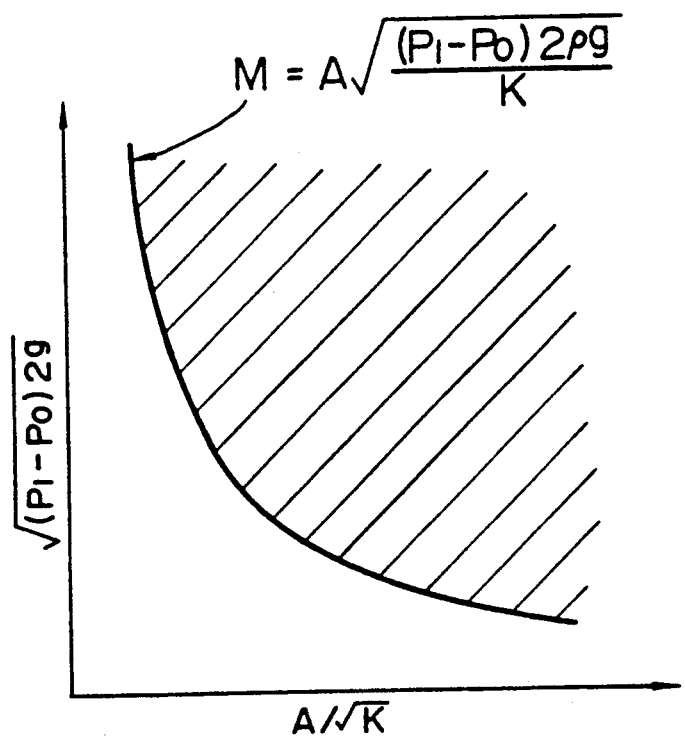
FIG. 17 is a graph illustrating the conditions to be met by a splashing device of the facilities shown in FIG. 15.

The amount of steam M generated at the core after the loss-of-coolant accident is expressed by the following formula:

$$M = Q/Mfg \quad (1)$$

where
M: amount of steam generated at the core
Q: decay heat in about half a day after the accident
Mfg: Evaporated latent heat The submergence apparatus in accordance with this embodiment is required to have an amount of water injected W which is greater than the amount of steam generated at the core, it suffices if the following condition is met:

$$M \leq W = \rho A v = \rho A \sqrt{\frac{(P_1 - P_0)2g}{K\rho}} \quad (2)$$

where
W: amount of water injected by facilities for maintaining submergence
A: area of piping channel
$\rho$: density of coolant ($=1$)
$P_0$: reactor pressure
$P_1$: static head on the blow side
K: pressure loss coefficient
g: gravity acceleration The relationships of Formula (2) are shown in FIG. 17.

The submergence apparatus in accordance with the present embodiment is required to meet the shadowed portion in FIG. 17.

After the accumulator water injecting system (the accumulator water tank 51 and the water injection pipe 126) has been made stable over a long period of time after the accident, the core apparatus described above makes it possible to compensate for the loss of cooling water evaporated by decay heat generated at the core, thereby maintaining the submergence of the core for a long period of time.

Figure 18:
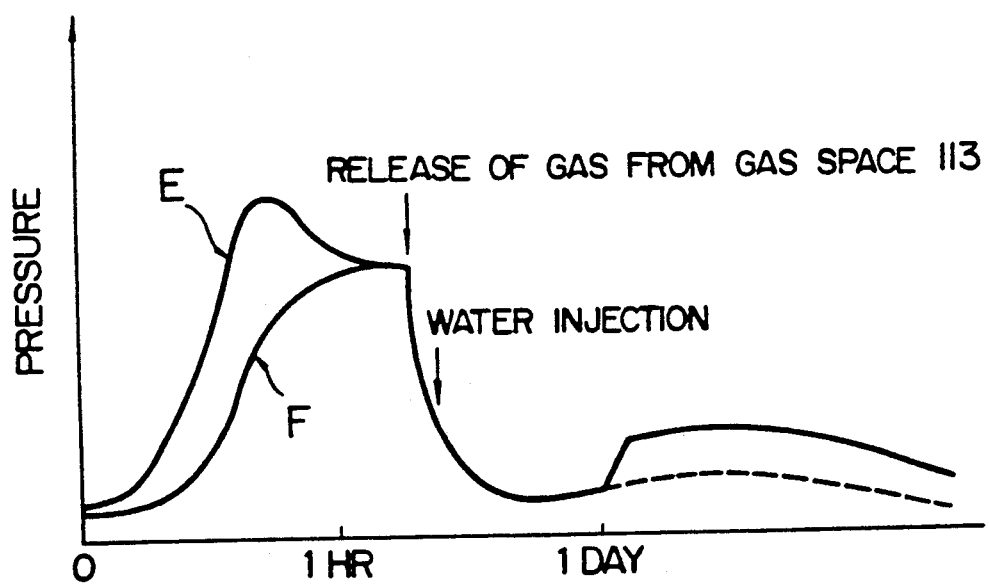
FIG. 18 is a graph illustrating the relationships between the operation of the splashing device and the internal pressure of the primary containment vessel.

In this embodiment, the level of the pool water 5 can be increased, as described above, after the occurrence of an accident in order to improve the core submergence capabilities. In this embodiment, since the core can be constantly maintained in a submerged state after the loss-of-coolant accident, and since a low-output density core (a natural circulation reactor) is adopted, there is no temperature rise of fuel rods resulting from a mismatching of the output and the flow rate immediately after the loss-of-coolant accident, and there is no possibility of radioactive substances being released into the primary containment vessel 1. Accordingly, in this plant, it is possible to release the atmosphere of the container to outside the system after the occurrence of the accident. By releasing the atmosphere of the container (noncondensable gas) to outside the system it is possible to substantially alleviate the pressure of the primary containment vessel, as shown in FIG. 18. In other words, after the gas inside the gas space 113 is released (i.e., the valve 122 is opened), the level of the pool water 5 is raised, which, in turn, allows the core submergence maintaining capabilities to be enhanced by increasing the differential pressure of the head of the core and pressure suppression pool water. By connecting an external water source to the cooling water supply pipe 52 and by supplying cooling water into the reactor pressure vessel 3, it is possible to introduce a large volume of cooling water from the return line 120 to the pressure suppression 6. In FIG. 18, a characteristic E is the pressure of the upper dry well, while a characteristic F is the pressure of the gas space 113. Each pressure decreases rapidly by the release of the gas contained in the gas space 113 and by the opening of the core submergence valve 115.

Since the reactor pressure vessel 13 is constructed such as to be supported at a bottom portion thereof by the concrete mat 110 via the pressure container skirt 111, a so-called low-gravity type reactor pressure vessel can be arranged in which the position of the core is very low in terms of the layout and construction of the reactor building 12.

According to this embodiment, the volume of the space of the dry well within the primary containment vessel 1 can be reduced remarkably, and, at the same time, the volume of the gas space 113 can be reduced, which in turn contributes to making the structure of the overall primary containment vessel 1 compact. Furthermore, since a major portion of the lower portion of the reactor pressure vessel 3 is surrounded by the pressure suppression 6, the vent wall 7 serves as a shield against gamma rays, so that a special gamma ray shield wall structure becomes unnecessary. This gives rise to the following advantages: Thanks to the water shield effect of the pool water 5 which is present around the reactor pressure vessel 3, the thickness of the biological shield wall 11 disposed outside the primary containment vessel can be reduced substantially in comparison with the prior art; a conventional pedestal supporting structure of the reactor pressure vessel made of concrete becomes unnecessary; and substantial improvement can be made in the antiseismic characteristics by virtue of the low gravity of the core 2. In addition, the above-described arrangement also contributes to the elimination of the structures of related facilities and the improvement of the shield effect. Thus, it is possible to obtain effects having large advantages, including a reduction in the costs through the streamlining of structures and the improvement of construction features the antiseismic safety.

In this embodiment, since the submergence equipment is disposed in the gas space inside the surrounding wall 114, the maintenance of the core submergence valve 115 and the like can be readily effected. A grating passage (not shown) is provided in the gas space 113. This passage allows an operator to access the submergence equipment to be inspected. Since the core submergence valve 115 is disposed inside the pressure suppression 6, the container 1 can be made compact.

Figure 19:
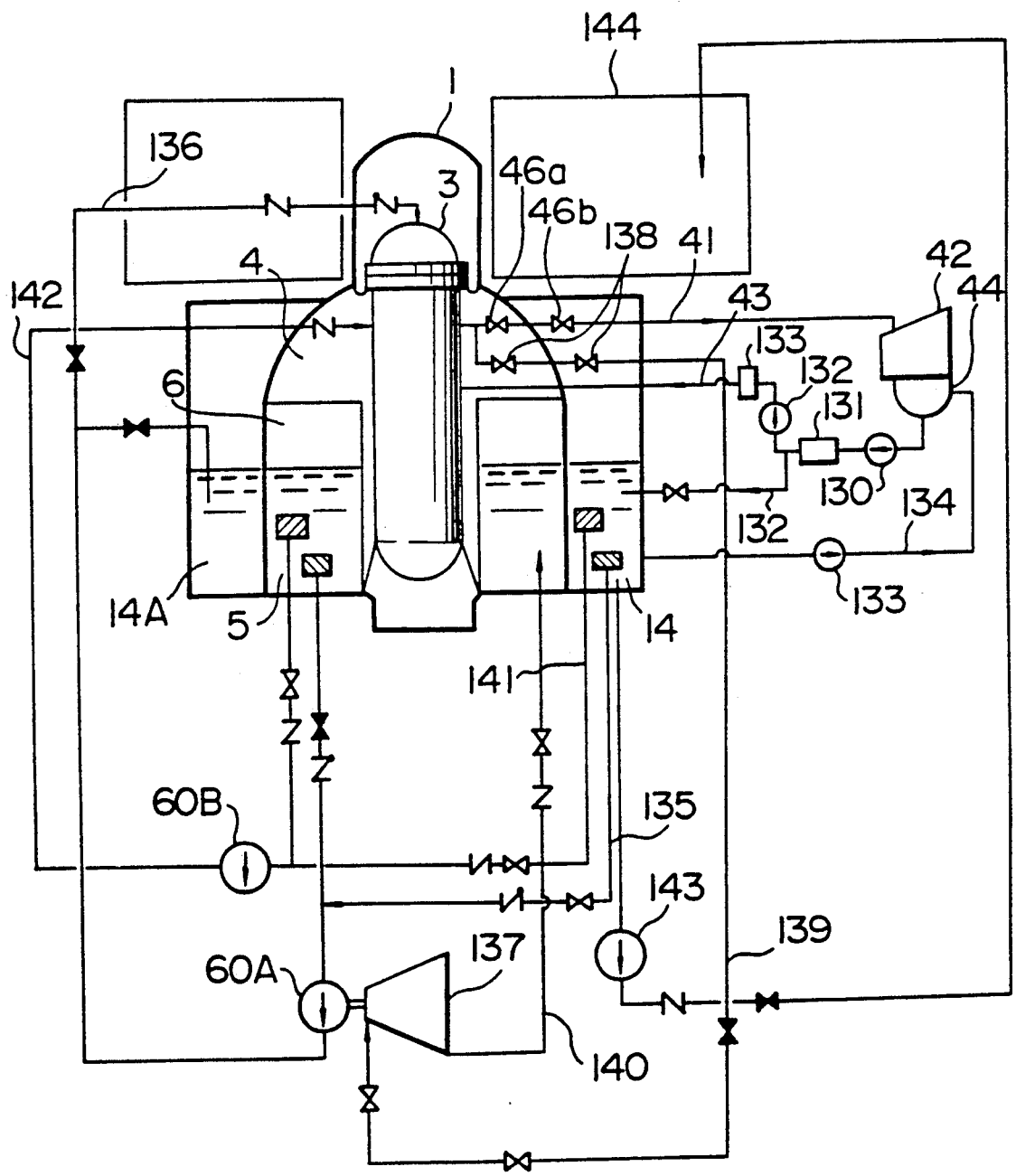
FIG. 19 is a diagram illustrating a further modification of the reactor facilities in accordance with the present invention.
Figure 20:
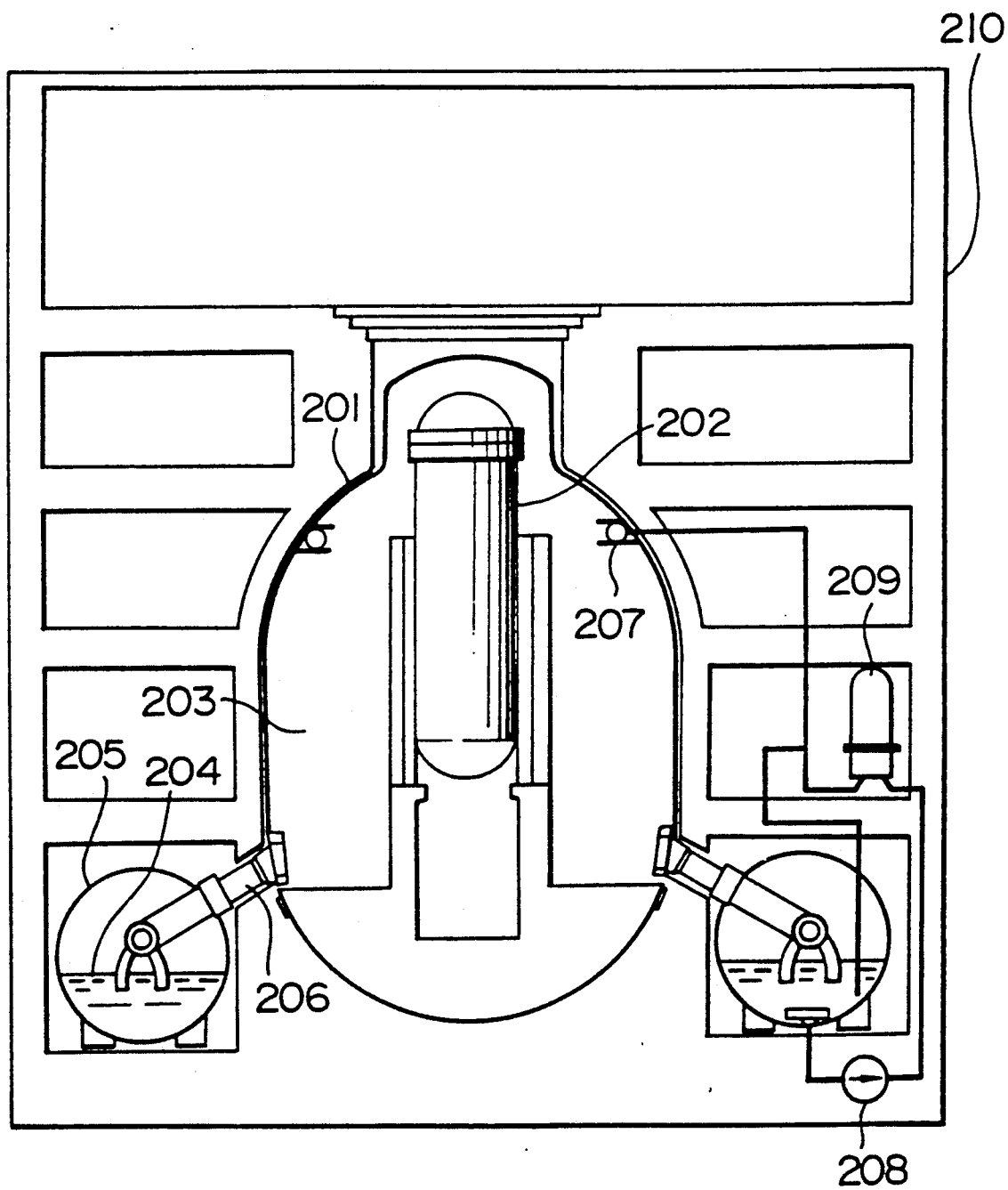
FIGS. 20 and 21 are diagrams illustrating conventional reactor facilities, respectively.
Figure 21:
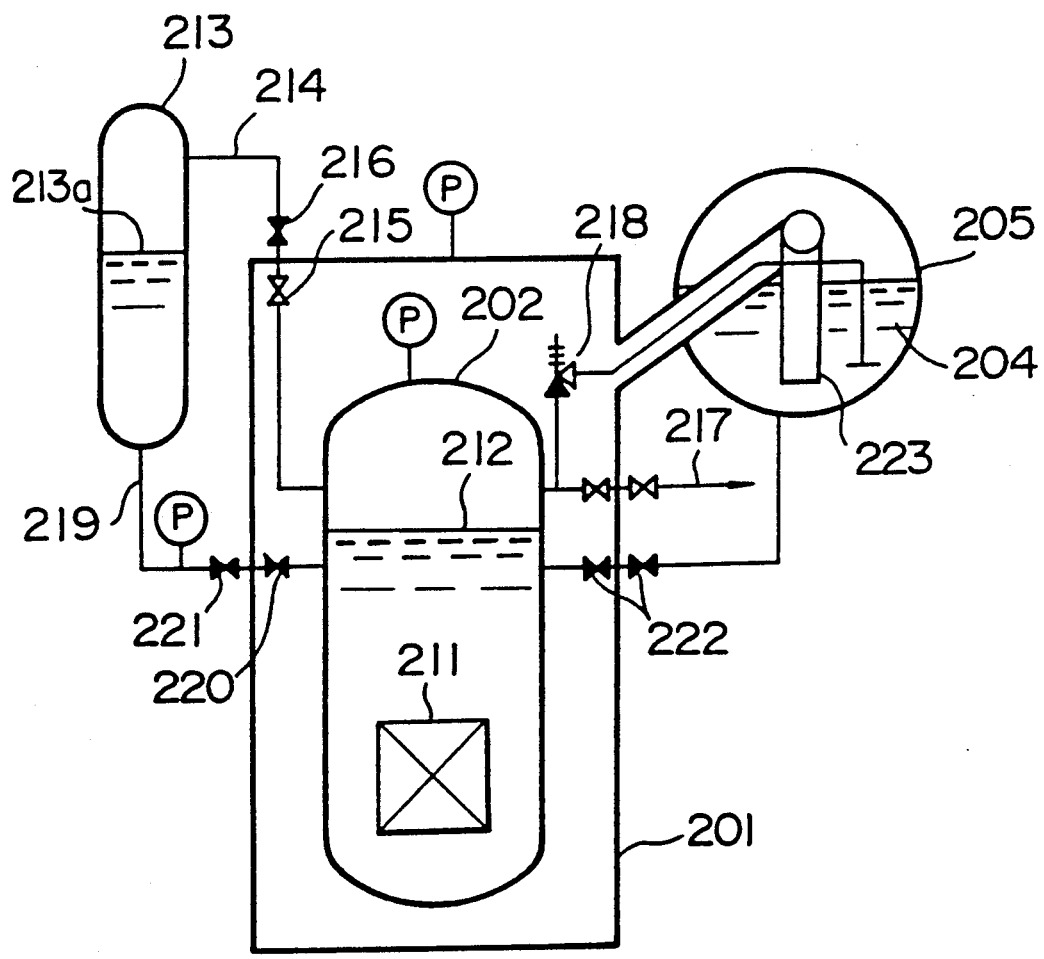

Referring now to FIG. 19, description will be made of a boiling water reactor in accordance with still another embodiment of the present invention.

Steam generated in the reactor pressure vessel 3 is sent to the turbine 42 by means of the main steam pipe 41. Steam exhausted by the turbine 42 is condensed into water by the condenser 44. This condensed water is returned as feed water to the reactor pressure vessel 3 by means of the feed water condenser line 43 provided with a condenser pump 130, a condenser filtration and desalination device 131, a feed water pump 132.

As shown in FIG. 19 in detail, the pool 14 is formed between the primary containment vessel 1 and the biological shield wall of the reactor building, and is an annular pool. The pressure suppression 6 surrounding the reactor vessel 3 and the pool 14 are disposed on the antiseismic concrete mat of the reactor building. Pool water 5 and 14A is filled in the pressure suppression 6 and the pool 14. The dry well 4 inside the primary containment vessel 1 is communicated with the suppression pool water 5 by means of a vent passage.

A spill-over line 132 bifurcating from the feed water condenser line 43 downstream of the condenser filtration and desalination device 131 is connected to the pool 14, and a replenishing line 134 having a pump 133 for moving the water of the pool disposed around the outer periphery of the container, thereby making it possible to make adjustment of the water retained in the supply and condenser lines. The replenishing line 134 is communicated with the condenser 44.

Meanwhile, a suction line for the reactor isolation cooling pump is connected to the pool 4.

At the time of the reactor isolation when main steam isolation valves 46a, 46b disposed in the main steam line 41 are closed quickly on receipt of a signal representing a low water level of the reactor, a reactor isolation cooling device is automatically started to boost the pressure of pool water 14A inside the pool 14 by means of a water injection pump 60A via a pump suction line 135 and to inject the water into the reactor pressure vessel 3 via a water injection line 136. In addition, when the level of the pool water 14A in the pool 14 is lowered, the operation is continued by changing over the water source to the pool water 5 in the pressure suppression 6.

The water injection pump 60A is driven by a turbine 137. An isolation valve 138 is opened on receipt of a signal representing the low level of the reactor water, and steam generated in the reactor pressure vessel 3 is led to the turbine 137 via the main steam pipe 41 and the steam supply line 139. The water injection pump 60A is driven by the operation of the turbine 137 using this steam. Steam exhausted from the turbine 137 is condensed and collected by pool water 5 in the pressure suppression 6 via a turbine exhaust pipe 140.

Thus, when a situation requiring the reactor isolation has occurred for some reason or other, decay heat from the core can be removed on the basis of the operation of the aforementioned reactor isolation cooling device. In addition, when a loss-of-coolant accident has occurred simultaneously at that time, the heat of steam released to the dry well 4 inside the container 1 can be moved to the pool 14 to effect static removal of heat. In other words, steam inside the dry well 4 is led into the pool water 5 in the pressure suppression 6 and is condensed therein. Although the temperature of the pool water 5 rises due to the steam condensation, the temperature of the pool water 5 is transmitted to the pool water 14A of the pool 14 via the side wall of the container (made of steel). In this case, an interlock for automatically stopping the reactor isolation cooling device is provided to secure water necessary for removing heat to the pool water 14A. Furthermore, the pool water 14A of the pool 14 is filled in such a manner that an amount of injection water for the reactor isolation cooling equipment and a total amount of steam generated at the time of heat removal on the occasion of a loss-of-coolant accident.

FIG. 19 further shows a structure which makes use of the pool water 14A of the pool 14 as the water source of a high-pressure core sprayer which is one system of the immergency core cooling system. This high-pressure core sprayer is automatically started on receipt of a signal representing the low water level of the reactor (said level being lower than that of the reactor low water level signal for driving the reactor isolation cooling equipment). The pressure of the pool water 14A in the pool 14 is raised by the water injection pump 60B via a pump suction line 141, and the high-pressure core sprayer sprays the water into the core inside the reactor pressure vessel 3 via a water injection line 142.

In addition, in the event that the level of the pool water 14A of the pool 14, which is a water source, has dropped, the operation is continued by changing over the water source to the pool water 5 in the pressure suppression 6.

FIG. 19 further shows a structure which employs the pool water 14A in the pool 14 as a water source of a fuel pool replenishing feed water device. This fuel pool replenishing feed water device replenishes spent fuel pool water overflowing by sloshing in a case where the normal replenishing water facilities cannot be used at the time of an earthquake. The pressure of the pool water 14A in the pool 14 is raised by a fuel pool replenishing water pump 143, and the water is thereby replenished to a spent fuel pool 144.

According to this embodiment, the pool disposed around the outer periphery of the container, which is a condensate storage pool corresponding to a condensate storage tank of a conventional plant, can be placed on a foundation mat in the central portion of the reactor building, and the length of the highly important pool piping system (the piping system used jointly at the time of an accident) which is installed in the reactor building can be reduced appreciably. In addition, since the pool piping system is installed directly on the antiseismic mat of the reactor building, the installation of a special antiseismic mat used for the condensate storage tank employed in a conventional plant is not required, with the result that a period of construction of the plant can be reduced.

Furthermore, since there is no need to install the condensate storage tank outdoors, as has been the case with a conventional plant, heat insulation facilities such as a freezing prevention heater are unnecessary, and the temperature of the pool disposed around the outer periphery of the container can be maintained to an adequate level by the use of ventilation and air-conditioning facilities within the reactor building without any influence of the temperature of the atmospheric air.

According to this embodiment, since the foundation mat exclusively used for the condensate storage tank which has hitherto been necessary is unnecessary, a period of construction of the reactor plant can be reduced.

What is claimed is:

1. A nuclear reactor facility comprising a primary containment vessel, a reactor pressure vessel installed in the primary containment vessel and accommodating a reactor core in a lower part thereof, a vertical cylindrical wall disposed in a lower part of the primary containment vessel around and spaced from the reactor pressure vessel so as to delimit an annular space therebetween, the vertical cylindrical wall having an upper end disposed at a position higher than an upper end of the reactor core, a diaphragm extending substantially horizontally between the upper end of the vertical cylindrical wall and an inner wall of the primary containment vessel for cooperating with the vertical cylindrical wall to separate a space in the primary containment vessel around the reactor pressure vessel into a pressure suppression chamber and a drywell which includes the annular space, the pressure suppression chamber accommodating therein a pool of liquid coolant wherein a level of the liquid coolant of the pool is higher than the upper end of the reactor core, the vertical cylindrical wall having a plurality of vent passages having an upper part at the upper end of the vertical cylindrical wall and exposed to the drywell and a lower part exposed to the pool of the liquid coolant in the pressure suppression chamber, a submergence line extending from the pressure suppression chamber to the reactor pressure vessel at a position above the upper end of the reactor core and having at least one valve therein for cooperating with the submergence line to introduce the liquid coolant from the pool of the liquid coolant in the pressure suppression chamber to the reactor pressure vessel when the valve is opened for cooling of the reactor core, and a channel member for enabling liquid coolant to flow from the annular space between the vertical cylindrical wall and the reactor pressure vessel in the drywell into the pressure suppression chamber when liquid coolant fills the annular space, the channel member having one end opened at an upper part of the vertical cylindrical wall to the annular space between the vertical cylindrical wall and the reactor pressure vessel and another end exposed to the pool of the liquid coolant in the pressure suppression chamber, the channel member having the one opened end thereof positioned higher than the level of the liquid coolant of the pool in the pressure suppression chamber.

2. A nuclear reactor facility according to claim 1, further comprising a gas discharge pipe extending outside of the primary containment vessel from a gaseous phase portion in the pressure suppression chamber which is above the level of the liquid coolant of the pool, and at least one valve being disposed in the gas discharge pipe.

* * * * *

UNITED STATES PATENT AND TRADEMARK OFFICE
CERTIFICATE OF CORRECTION

PATENT NO. : 5,087,408
DATED : February 11, 1992
INVENTOR(S) : K. Tominaga, et al.

It is certified that error appears in the above-identified patent and that said Letters Patent is hereby corrected as shown below:

On the Title Page, item

"[76] Inventors: Kenji Tominaga, 21,...all of Japan"

should read:

--[76] Inventors: Kenji Tominaga, 21, Nagasaki-5-chome, Toshima-ku, Tokyo; Minoru Miki, 12-5, Nishinarusawacho-4-chome, Hitachi-shi; Tetsuo Horiuchi, 13-12, Wakabacho-1-chome, Hitachi-shi; Hideo Morishima, 20-30, Kujicho-4-chome, Hitachi-shi; Takashi Nakayama, 1-1, Jonancho-4-chome, Hitachi-shi, all of Japan--.

Signed and Sealed this

Twenty-fourth Day of August, 1993

Attest:

BRUCE LEHMAN

*Attesting Officer*   Commissioner of Patents and Trademarks